(12) United States Patent
Zhang et al.

(10) Patent No.: US 12,337,710 B2
(45) Date of Patent: Jun. 24, 2025

(54) CHARGING PILE

(71) Applicant: Sungrow Power Supply Co., Ltd., Hefei (CN)

(72) Inventors: Qingfeng Zhang, Anhui (CN); Linchong Xu, Anhui (CN); Yuefeng Yang, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 739 days.

(21) Appl. No.: 17/505,923

(22) Filed: Oct. 20, 2021

(65) Prior Publication Data
US 2022/0118867 A1 Apr. 21, 2022

(30) Foreign Application Priority Data

Oct. 21, 2020 (CN) .......................... 202011132494.0

(51) Int. Cl.
*H02J 7/00* (2006.01)
*B60L 53/302* (2019.01)
(Continued)

(52) U.S. Cl.
CPC ............ *B60L 53/302* (2019.02); *B60L 53/31* (2019.02); *B60L 2210/10* (2013.01)

(58) Field of Classification Search
CPC ..... B60L 53/302; B60L 53/31; B60L 2210/10
(Continued)

(56) References Cited

U.S. PATENT DOCUMENTS 3,954,064 A * 5/1976 Minovitch ............ H01F 7/0236
104/130.02
5,909,099 A * 6/1999 Watanabe ............ A61K 31/728
320/108
(Continued)

FOREIGN PATENT DOCUMENTS

CN 206878529 U 1/2018
CN 109484228 A 3/2019
(Continued)

OTHER PUBLICATIONS

EP21203792.3, Mar. 7, 2022, Extended European Search Report.
Extended European Search Report for European Application No. 21203792.3, dated Mar. 7, 2022.

*Primary Examiner* — Alexis B Pacheco
(74) *Attorney, Agent, or Firm* — Wolf, Greenfield & Sacks, P.C.

(57) ABSTRACT

A charging pile is provided, including: a charging unit and at least one air-cooled radiator arranged in a box; the box includes a first box and a second box, a protection level of the first box is higher than a protection level of the second box; the charging unit is arranged in the first box; an independent heat dissipation air duct is provided in the second box so that the charging unit dissipates heat through the heat dissipation air duct; and the charging unit is configured to charge an electrical equipment, thereby avoiding need to design a heat dissipation module for each power conversion module in the charging pile and then perform a secondary design of the heat dissipation air duct on the entire charging pile in the conventional technology, which reduces cost of the charging pile and improves a level of protection of the charging pile.

22 Claims, 20 Drawing Sheets

(51) Int. Cl.
   *B60L 53/31* (2019.01)
   *H02J 7/14* (2006.01)
(58) Field of Classification Search
   USPC .......................................................... 320/107
   See application file for complete search history.

(56) References Cited

U.S. PATENT DOCUMENTS

| | | | |
|---|---|---|---|
| 6,396,241 | B1 | 5/2002 | Ramos et al. |
| 10,688,873 | B2 * | 6/2020 | Götz et al. ............... B60L 53/14 |
| 11,148,534 | B2 * | 10/2021 | Reber ..................... B60L 53/31 |
| 2011/0204720 | A1 | 8/2011 | Ruiz et al. |
| 2012/0181990 | A1 * | 7/2012 | Asakura ................... H02J 5/00 320/137 |
| 2013/0049677 | A1 * | 2/2013 | Bouman ................... B60L 1/02 320/106 |
| 2013/0175987 | A1 * | 7/2013 | Amma ..................... H02J 50/90 320/108 |
| 2014/0021780 | A1 * | 1/2014 | Choi ....................... H02M 3/158 320/109 |
| 2014/0139182 | A1 * | 5/2014 | Ichikawa ................ B60L 53/18 320/109 |
| 2014/0347017 | A1 * | 11/2014 | Sugano ................. B60L 53/122 320/137 |
| 2015/0306974 | A1 * | 10/2015 | Mardall ............... H01M 10/625 429/120 |
| 2016/0121735 | A1 * | 5/2016 | Sugano ................... H02J 7/342 320/109 |
| 2017/0088005 | A1 * | 3/2017 | Christen ................. B60L 53/14 |
| 2018/0162229 | A1 * | 6/2018 | Götz ..................... H02J 7/0042 |
| 2018/0272886 | A1 * | 9/2018 | Stöcker ................ B60L 53/305 |
| 2018/0297473 | A1 * | 10/2018 | Helnerus ................. B60L 3/04 |
| 2019/0106009 | A1 * | 4/2019 | Heyne ................... B60L 53/302 |
| 2019/0118671 | A1 * | 4/2019 | Helnerus ................. B60L 53/16 |
| 2019/0255961 | A1 * | 8/2019 | Heyne ................... B60L 53/302 |
| 2019/0308519 | A1 * | 10/2019 | Tsukamoto ............. B60L 53/66 |
| 2020/0114774 | A1 * | 4/2020 | Helnerus ................. B60L 53/31 |
| 2020/0171967 | A1 * | 6/2020 | Gohla-Neudecker ........................ B60L 53/11 |
| 2020/0180457 | A1 * | 6/2020 | Waffner ................. B60L 53/31 |
| 2020/0391601 | A1 * | 12/2020 | Maeshiro ................ B60L 53/16 |

FOREIGN PATENT DOCUMENTS

| | | |
|---|---|---|
| CN | 208914988 U | 5/2019 |
| CN | 110027432 A | 7/2019 |
| CN | 209921094 U | 1/2020 |
| CN | 110838745 A | 2/2020 |
| CN | 210116398 U | 2/2020 |
| CN | 110957775 A | 4/2020 |

* cited by examiner

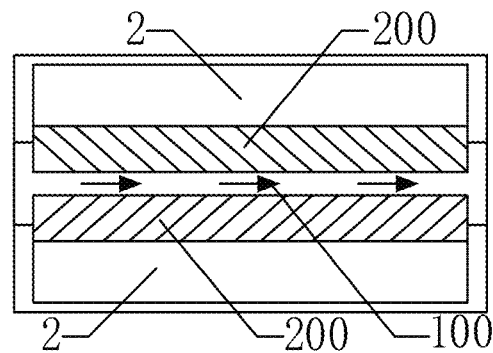
Figure 7
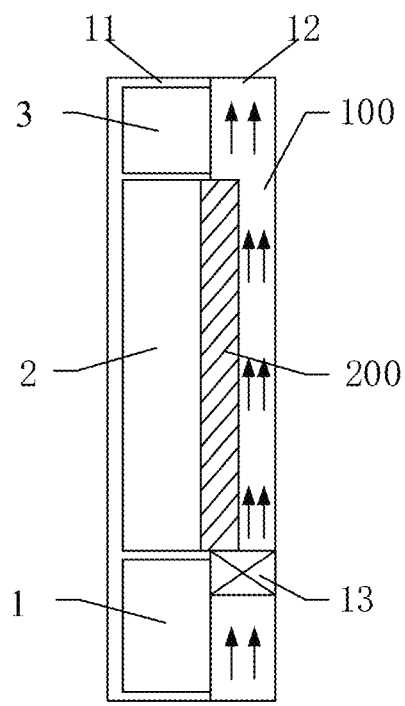 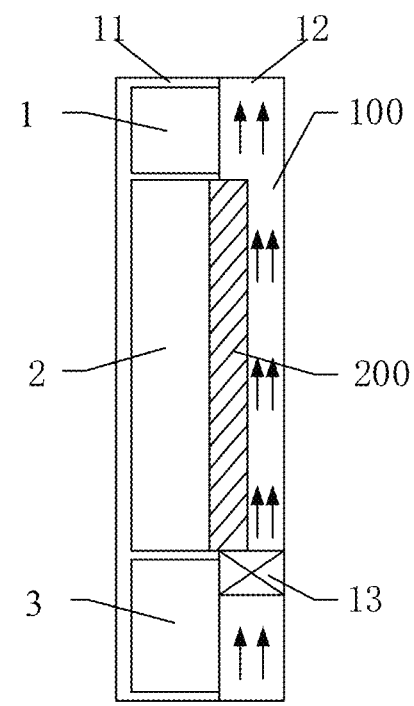
Figure 8(a)  Figure 8(b)

CHARGING PILE

This application claims the priority to Chinese Patent Application No. 202011132494.0, titled "CHARGING PILE", filed on Oct. 21, 2020 with the China National Intellectual Property Administration, the contents of which are incorporated herein by reference.

FIELD

The present disclosure relates to the technical field of charging piles, and in particular, to a charging pile.

BACKGROUND

A power conversion part of a traditional direct current (DC) charging pile is basically designed separately to form a power conversion module. For example, the power conversion module is used as a black box. Different power levels are obtained by paralleling different numbers of power conversion modules. Each power conversion module has its own heat dissipation module, and the traditional DC charging pile as a whole also needs to be designed for secondary heat dissipation according to its heat dissipation method, which virtually increase cost and make it difficult to improve a level of protection.

SUMMARY

In view of this, an objective of the present disclosure is to provide a charging pile, which is used to integrate various components in a charging unit in the charging pile as a whole, to simply a design of heat dissipation, reduce cost of the charging pile and improve a level of protection.

A charging pile is provided in the present disclosure, including: a charging unit and at least one air-cooled radiator, the charging unit and the at least one air-cooled radiator being arranged in a box of the charging pile;
  the box includes a first box and a second box, a protection level of the first box is higher than a protection level of the second box;
  the charging unit is arranged in the first box;
  an independent heat dissipation air duct is provided in the second box so that the charging unit dissipate heat through the heat dissipation air duct; and
  the charging unit is configured to charge an electrical equipment.

In an embodiment, the first box adopts a sealed design.

In an embodiment, the charging unit includes: an alternating current (AC) power access unit, a power distribution unit, and at least one power conversion unit;
  an input end of the AC power access unit is configured to be an input end of the charging unit for receiving AC power supply;
  an output end of the AC power access unit is connected to an AC side of the power conversion unit;
  a plurality of direct current (DC) sides of the power conversion unit are respectively connected to a plurality of input ends of the power distribution unit; and
  an output end of the power distribution unit is configured to be an output end of the charging unit.

In an embodiment, each of the AC power access unit, the power distribution unit, and the at least one power conversion unit in the charging unit is arranged from bottom to top, or from top to bottom, or from left to right, or from right to left, along a power flow direction in the charging unit.

In an embodiment, an airflow direction in the heat dissipation air duct is parallel or perpendicular to a power flow direction in the charging unit.

In an embodiment, a power flow direction is opposite or the same as the air flow direction of the air-cooled radiator.

In an embodiment, the power conversion unit includes multiple heating elements, and when the multiple heating elements are arranged on multiple sides of the air-cooled radiator, each of the multiple heating elements on different sides of the air-cooled radiator is connected by a cable in a sealed wire groove.

In an embodiment, the first box is provided with waterproof terminals at both the input end and the output end of the charging unit.

In an embodiment, the air-cooled radiator includes at least one heat dissipation plate and a fan;
  one side of the heat dissipation plate is arranged in the first box, and the other side of the heat dissipation plate is arranged in the second box;
  the fan is configured to agitate the airflow in the heat dissipation air duct.

In an embodiment, the heat dissipation plate includes a substrate and a heat exchanger;
  the substrate serves as a common boundary plate for the first box and the second box;
  one side of the heat exchanger is arranged on the substrate in the second box; and
  the other side of the heat exchanger is provided with a heat dissipation fin.

In an embodiment, the power conversion unit in the charging unit is provided on the substrate; or
  the power conversion unit in the charging unit sinks inside the heat exchanger.

In an embodiment, the fan is arranged at bottom or top of the heat dissipation plate in the second box.

In an embodiment, two heat dissipation plates are provided, and the two heat dissipation plates are parallel; or multiple heat dissipation plates are provided, and each of the multiple heat dissipation plates forms a polygonal prism structure; and
  the heat dissipation air duct is arranged between each of the multiple heat dissipation plates.

In an embodiment, each of the multiple heat dissipation plates is provided with a heating element.

In an embodiment, the heat dissipation air duct is placed in a center, or at a position of a central axis of the box.

In an embodiment, the heat dissipation air duct is placed between an air inlet and an air outlet of the box.

In an embodiment, the airflow direction in the heat dissipation air duct is any one of bottom-up, top-down, left-to-right, and right-to-left.

In an embodiment, when the airflow direction in the heat dissipation air duct is bottom-top, setting positions of the air inlet and the air outlet of the box are one of the following:
  the air inlet is located on a lower side or back panel of the box, and the air outlet is located at top of the box;
  the air inlet is located on the lower side of the box, and the air outlet is located at an upper side of the box; and
  the air inlet is located at a lower part of a rear cover, and the air outlet is located on an upper side of the rear cover.

In an embodiment, when the airflow direction in the heat dissipation air duct is top-bottom, the setting positions of the air inlet and the air outlet of the box are one of the following:
  the air inlet is located at the top of the box, and the air outlet is located on a side of the box;

the air inlet is located on the upper side of the box, and the air outlet is located on the lower side of the box; and the air inlet is located at an upper part of the rear cover of the box, and the air outlet is located at the lower part of the rear cover of the box.

In an embodiment, a setting mode of the AC power access unit and the power distribution unit is any one of the following:

the power distribution unit and the AC power access unit are respectively arranged at top and bottom inside of the box;

the power distribution unit and the AC power access unit are both arranged at the top or bottom inside of the box;

one of the power distribution unit and the AC power access unit is located at front end of the power conversion unit and at the top inside of the box, and the other one is located at the bottom inside of the box;

one of the power distribution unit and the AC power access unit is located at the front end of the power conversion unit and arranged at the bottom inside of the box, and the other one is located at the top inside of the box; and the power distribution unit and the AC power access unit are both located at the front end of the power conversion unit and are respectively located at the top and bottom inside of the box.

In an embodiment, the power conversion unit includes: a rectifier module and n DC/DC converters, where n is an integer greater than 1;

an AC side of the rectifier module is configured to be an input end of the power conversion unit;

a DC side of the rectifier module is connected to input ends of the n DC/DC converters respectively; and output ends of the n DC/DC converters are respectively configured to be output ends of the power conversion unit.

In an embodiment, the AC power access unit includes a switch unit;

A, B, and C three-phase inputs of an AC power supply are connected to input ends of the switch unit in a one-to-one correspondence; and output ends of the switch unit respectively are configured to be the output end of the AC power access unit.

In an embodiment, the switch unit includes a drive circuit and an AC relay group;

input ends of the AC relay group are connected to the input ends of the switch unit;

output ends of the AC relay group are connected to the output ends of the switch unit; and the AC relay group is controlled by the drive circuit.

In an embodiment, the AC relay group includes switch subunits respectively arranged on each phase cable in the AC relay group.

In an embodiment, the switch subunits include at least one relay.

In an embodiment, the switch subunits include two relays connected in series.

In an embodiment, the switch unit further includes a circuit breaker, and the circuit breaker is arranged between the input ends of the switch unit and the input ends of the AC relay group.

In an embodiment, the AC power access unit further includes a lightning arrester, and the A, B, and C three-phase inputs of the AC power supply are grounded through the lightning arrester.

In an embodiment, the charging unit further includes: a centralized control unit, and the centralized control unit is configured to:

send a first control signal to the AC power access unit to enable the AC power access unit to switch on and off;

send a pulse width modulation (PWM) signal to the power conversion unit to enable the power conversion unit to implement electric energy conversion; and, send a second control signal to the power distribution unit to enable the power distribution unit to implement distribution of output power.

In an embodiment, the charging unit further includes a distributed control unit, the distributed control unit includes a system controller and multiple sub-controllers; and each of the sub-controllers is respectively connected to the system controller in communication.

In an embodiment, the charging pile further includes at least one charging gun arranged outside of the box, and the charging unit charges the electrical equipment through the charging gun.

It can be seen from the above technical solutions that the charging pile provided by the present disclosure includes: a charging unit and at least one air-cooled radiator arranged in a box; the box includes a first box and a second box, a protection level of the first box is higher than a protection level of the second box; the charging unit is arranged in the first box; an independent heat dissipation air duct is provided in the second box to make the charging unit dissipate heat through the heat dissipation air duct; and the charging unit is configured to charge an electrical equipment, thereby avoiding need to design a heat dissipation module for each power conversion module in the charging pile and then perform a secondary design of the heat dissipation air duct on the entire charging pile in the conventional technology, which reduces the cost of the charging pile and improves the level of protection of the charging pile.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained according to the provided drawings without paying creative labor.

FIGS. 1 to 7 are schematic diagrams of a charging pile according to the embodiments of the present disclosure;

FIGS. 8(*a*) to 19 are schematic diagrams of setting position of each unit in a charging pile according to embodiments of the present disclosure.

DETAILED DESCRIPTION

The technical solution according to the embodiments of the present application will be described clearly and completely as follows in conjunction with the accompany drawings in the embodiments of the present application, so that purposes, technical solutions and advantages of the present application can be more obvious. It is obvious that the described embodiments are only a part of the embodiments according to the present application, rather than all of the embodiments. All the other embodiments obtained by those skilled in the art based on the embodiments in the present application without any creative work belong to the scope of protection of the present application.

In the present application, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

A charging pile is provided in an embodiment of the present disclosure, which is used to solve the problem that in the conventional technology, each power conversion module needs its own heat dissipation module, and the traditional direct current (DC) charging pile as a whole also needs to be designed for secondary heat dissipation according to its heat dissipation method, which virtually increase cost and make it difficult to improve a level of protection.

Figure 1:
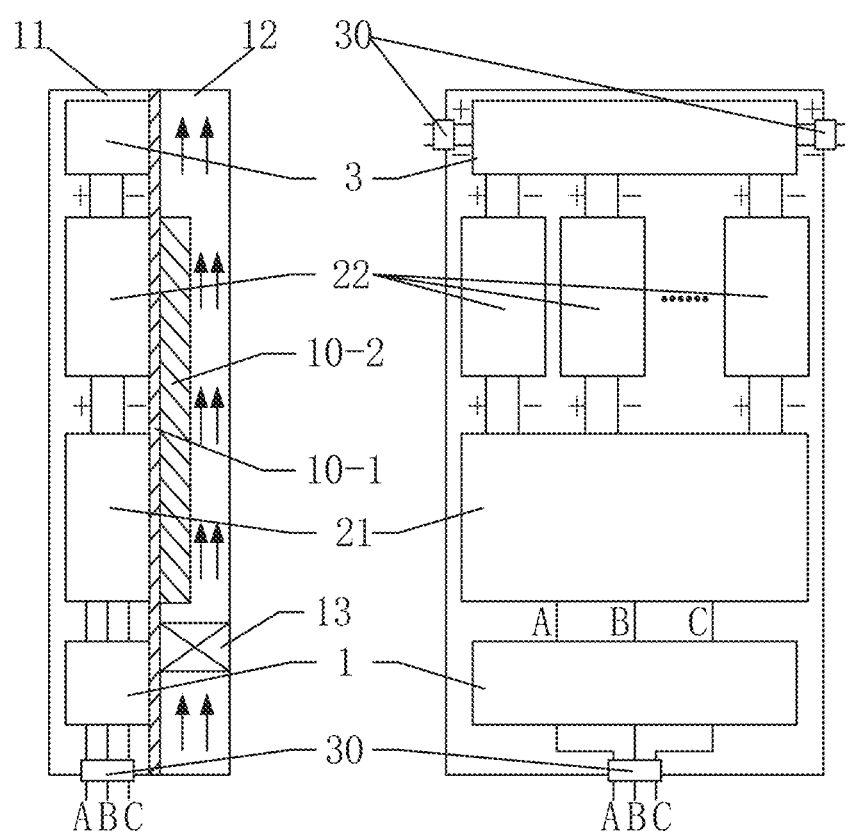

Referring to FIG. 1, the charging pile includes: a charging unit and at least one air-cooled radiator arranged in a box.

The box includes a first box 11 and a second box 12, a protection level of the first box is higher than a protection level of the second box. The charging unit is arranged in the first box 11. In practical applications, the first box may adopt a sealed design.

The charging unit is configured to charge an electrical equipment. Specifically, the charging unit is directly or indirectly connected to the electrical equipment, so that the charging unit can charge the electrical equipment.

In practical applications, the charging pile may also include at least one charging gun, and each output end of the charging unit is respectively connected to a corresponding charging gun, and the charging gun is configured to connect the electrical equipment, such as an electric car, so that the charging unit may charge the electrical equipment through the corresponding charging gun.

An independent heat dissipation air duct is provided in the second box 12 to make the charging unit dissipate heat through the heat dissipation air duct. Specifically, one side of a heat dissipation plate of the air-cooled radiator is arranged in the first box 11, and the other side of the heat dissipation plate is arranged in the second box 12. Specifically, one side of the heat dissipation plate in the air-cooled radiator faces inside of the first box 11, and the other side of the heat dissipation plate in the air-cooled radiator faces inside of the second box 12. That is, the heat between the first box 11 and the second box 12 may be conducted to each other; and the second box 12 may be dissipated to realize a function of heat dissipation of the first box 11. The heat generated when the charging unit is working is conducted through the heat dissipation plate facing the first box 11 to the heat dissipation plate facing the second box 12, and then the air-cooled radiator blows airflow in the heat dissipation duct to take the heat away to achieve heat dissipation.

A power conversion unit in this embodiment does not need to be equipped with a heat dissipation module. For example, the power conversion unit may be an integrated conversion device implemented by connecting multiple DC/DC converters to a rear stage of a rectifier module. An integrated high-power conversion equipment replaces parallel connection of multiple power conversion modules in the conventional technology, and is directly to dissipate heat through the air-cooled radiator, thereby avoiding need to design a heat dissipation module for each power conversion module in the charging pile and then perform a secondary design of the heat dissipation air duct on the entire charging pile in the conventional technology, so that the cost of the charging pile is reduced and the level of protection of the charging pile is improved.

It is worth noting that a technical source of the power conversion module in the conventional technology is communication power supply, which has a strict requirement on a working environment. The power conversion module is easy to fail in an environment of high temperature, high humidity, high salt spray or strong wind and sand. However, in this embodiment, the charging unit is arranged in the first box 11 with a sealed design, and the independent heat dissipation air duct dissipates heat for the charging unit, thereby avoiding a problem of failure of the charging unit in the environment of high temperature, high humidity, high salt spray or strong wind and sand, and the level of protection of the charging pile is significantly improved than the conventional solution.

Figure 20:
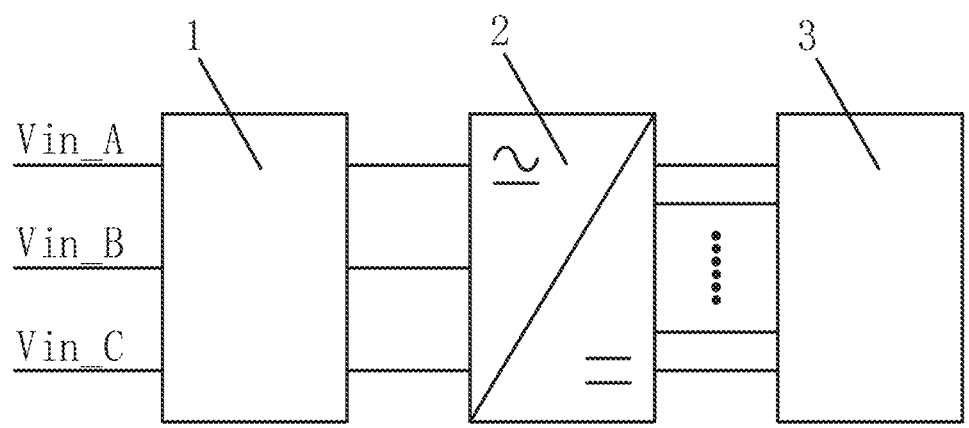
FIGS. 20 to 26 are schematic diagrams of a charging unit of the charging pile according to the embodiments of the present disclosure.

In the above embodiment, referring to FIG. 20, the charging unit includes: an alternating current (AC) power access unit 1, a power distribution unit 3, and at least one power conversion unit 2.

An input end of the AC power access unit 1 serves as an input end of the charging unit of the charging pile for receiving AC power supply. An output end of the AC power access unit 1 is connected to an AC side of the power conversion unit 2; each DC side of the power conversion unit 2 is respectively connected to a plurality of input ends of the power distribution unit 3; and each output end of the power distribution unit 3 serves as each output end of the charging unit of the charging pile for connecting a corresponding charging gun of the charging pile. Specifically, each output end of the power distribution unit 3 provides electrical energy and charges the corresponding electrical equipment, such as an electric car, through the corresponding charging gun.

It should be noted that the first box 11 is provided with waterproof terminals 30 at both the input end and the output end of the charging unit.

Specifically, a setting mode of the AC power access unit 1 and the power distribution unit 3 is any one of the following.

(1) As illustrated in FIG. 8(a) and FIG. 8(b), the power distribution unit 3 and the AC power access unit 1 are respectively arranged at top and bottom inside the first box 11. Specifically, the power distribution unit 3 is arranged at the top inside the first box 11, and the AC power access unit 1 is arranged at the bottom inside the first box 11; or, the power distribution unit 3 is arranged at the bottom inside the first box 11, and the AC power access unit 1 is arranged at the top inside the first box 11.

Figure 9A:
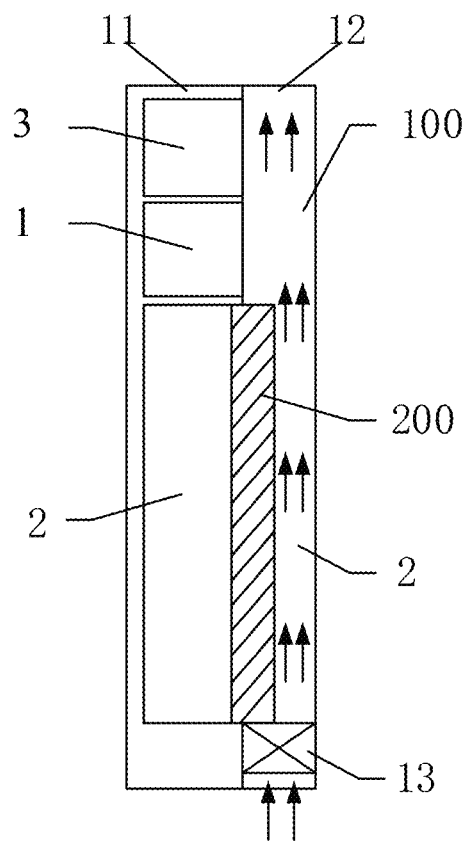
Figure 9B:
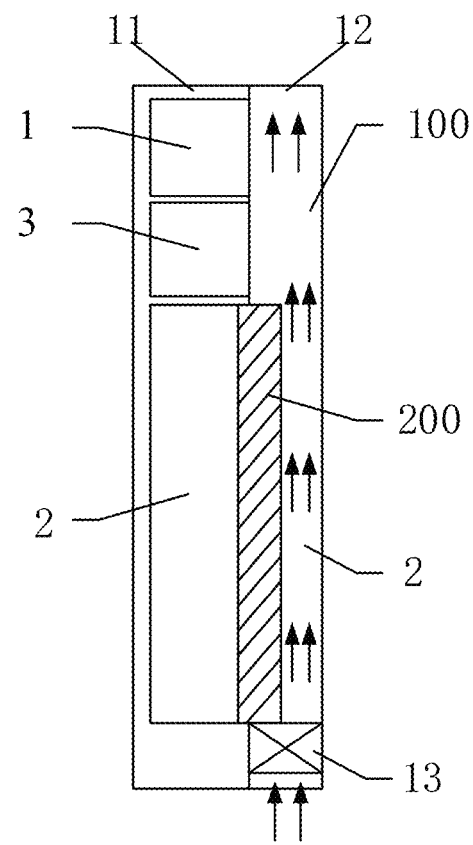
Figure 10A:
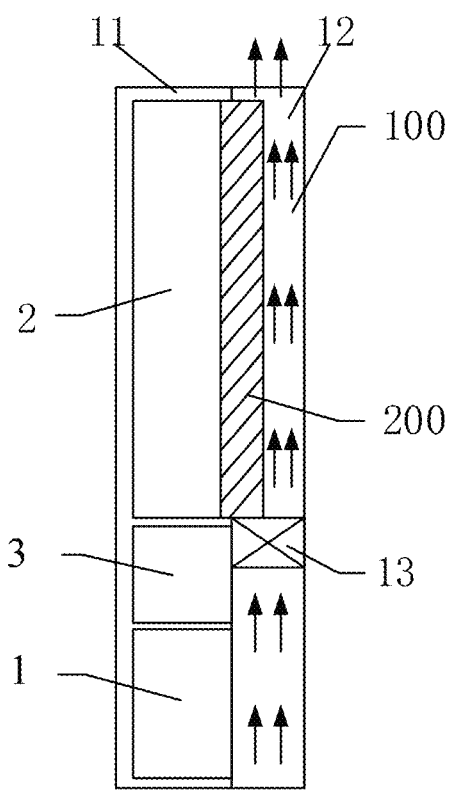
Figure 10B:
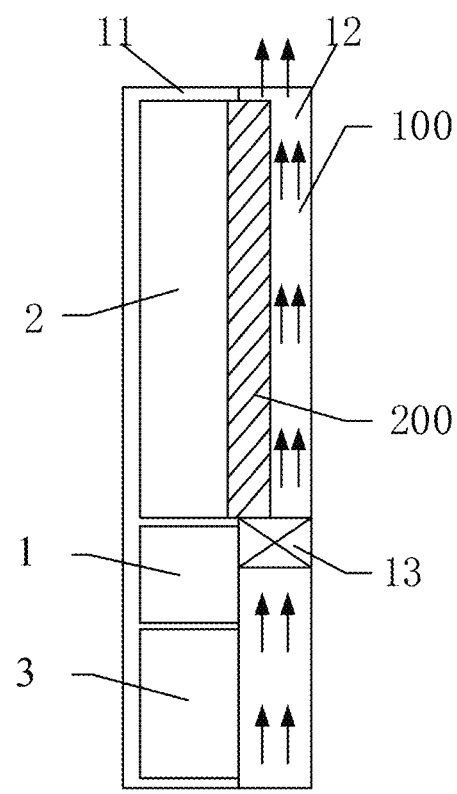

(2) As illustrated in FIG. 9(a) to FIG. 10(b), the power distribution unit 3 and the AC power access unit 1 are both arranged at the top or bottom inside the first box. Specifically, as illustrated in FIG. 9(a) and FIG. 9(b), the power distribution unit 3 and the AC power access unit 1 are both arranged at the top inside the first box 11; or, as illustrated in FIG. 10(a) and FIG. 10(b), the power distribution unit 3 and the AC power access unit 1 are both arranged at the bottom inside the first box 11.

Figure 11A:
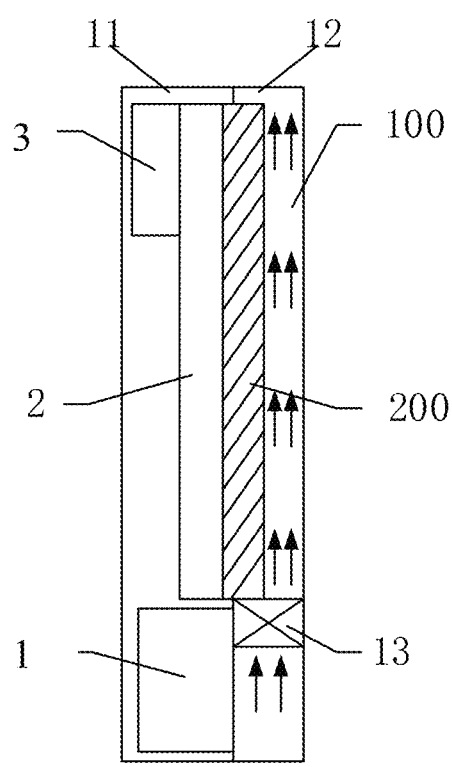
Figure 11B:
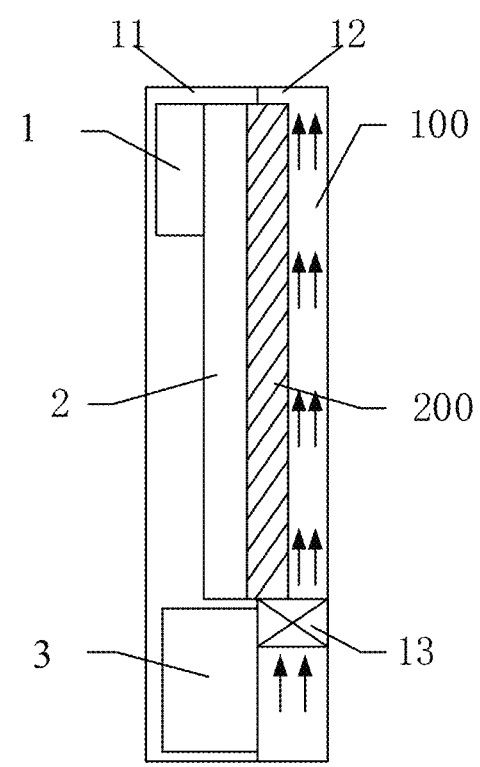

(3) As illustrated in FIG. 11(a) and FIG. 11(b), one of the power distribution unit 3 and the AC power access unit 1 is located at front end of the power conversion unit 2 and at the top inside the first box 11, and the other is located at the bottom inside the first box 11. Specifically, the power distribution unit 3 is located at the front end of the power conversion unit 2 and is set at the top inside the first box 11, and the AC power access unit 1 is located at the bottom inside the first box 11; or, the AC power access unit 1 is located at the front end of the power conversion unit 2 and is set at the top inside the first box 11, and the power distribution unit 3 is set at the bottom inside the first box 11.

Figure 12A:
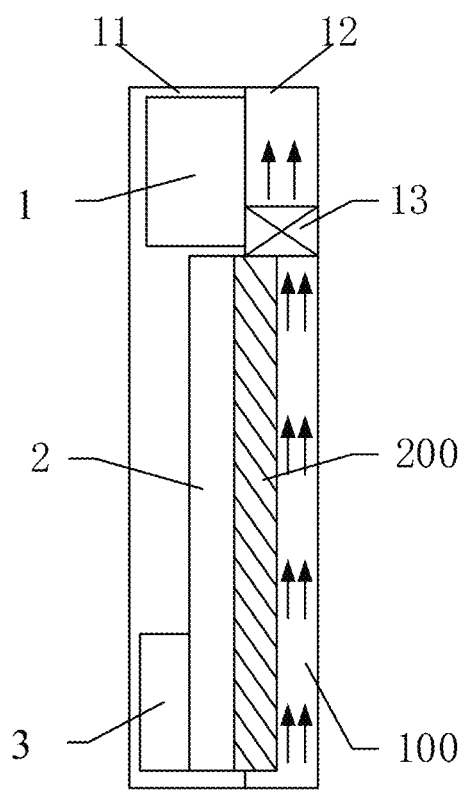
Figure 12B:
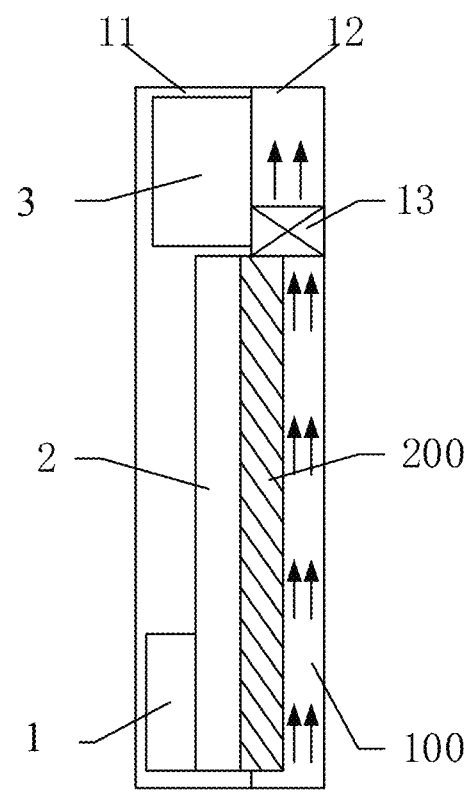

(4) As illustrated in FIG. 12(a) and FIG. 12(b), one of the power distribution unit 3 and the AC power access unit 1 is located at the front end of the power conversion unit 2 and arranged at the bottom inside the first box 11, and the other is located at the top inside the first box 11. Specifically, the power distribution unit 3 is located at the front end of the power conversion unit 2 and is set at the bottom inside the first box 11, and the AC power access unit 1 is located at the top inside the first box 11; or, the AC power access unit 1 is located at the front end of the power conversion unit 2 and is arranged at the bottom inside of the first box 11, and the power distribution unit 3 is arranged at the top inside of the first box 11.

Figure 13A:
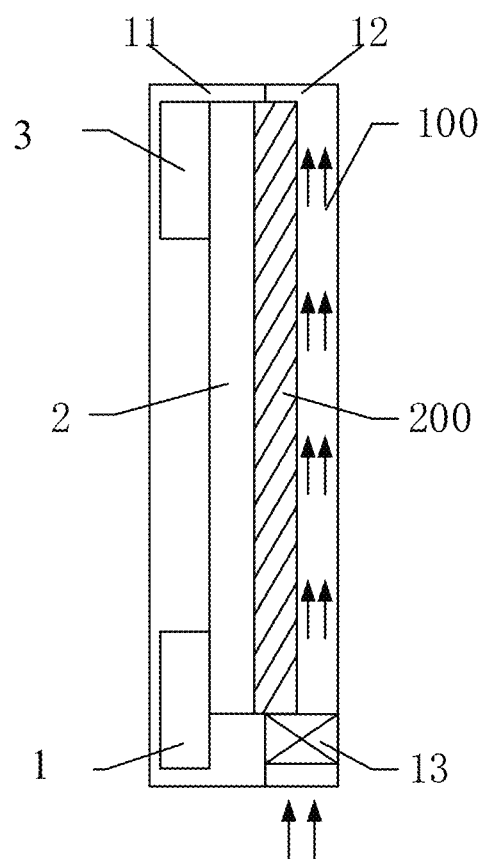
Figure 13B:
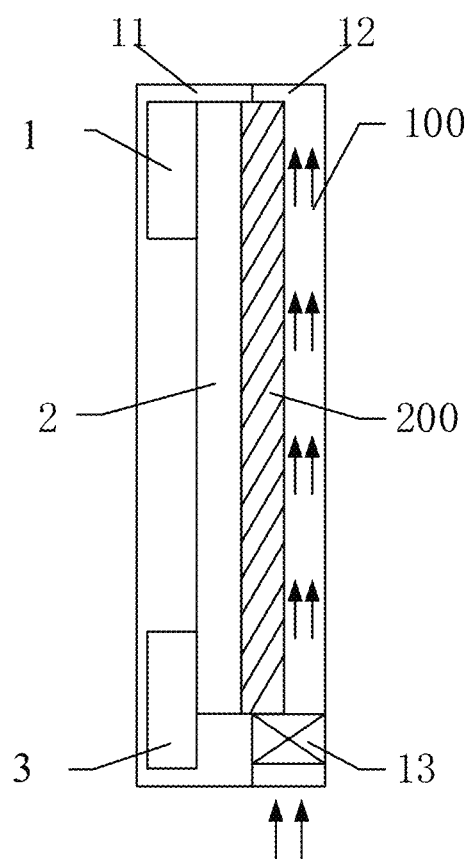

(5) As illustrated in FIG. 13(a) and FIG. 13(b), the power distribution unit 3 and the AC power access unit 1 are both located at the front end of the power conversion unit 2 and are respectively located at the top and bottom inside of the first box 11. Specifically, the power distribution unit 3 is located at the front end of the power conversion unit 2 and is placed at the top inside the first box 11, and the AC power access unit 1 is located at the front end of the power conversion unit 2 and is placed at the bottom inside the first box 11; or the power distribution unit 3 is located at the front end of the power conversion unit 2 and is placed at the bottom inside the first box 11, and the AC power access unit 1 is located at the front end of the power conversion unit 2 and is placed at the top inside the first box 11.

In practical applications, specifically, the units in the charging unit are arranged in sequence according to a power flow direction as: an input end of three-phase AC cable to a waterproof terminal 30 at the input end of the charging unit in the first box 11 to the AC power access unit of the charging unit 1 to a rectification module of the charging unit to a DC/DC converter 2-3 of the charging unit to the power distribution unit 3 of the charging unit to a waterproof terminal 30 at the output end of the charging unit in the first box 11 and then to the charging gun.

Figure 2:
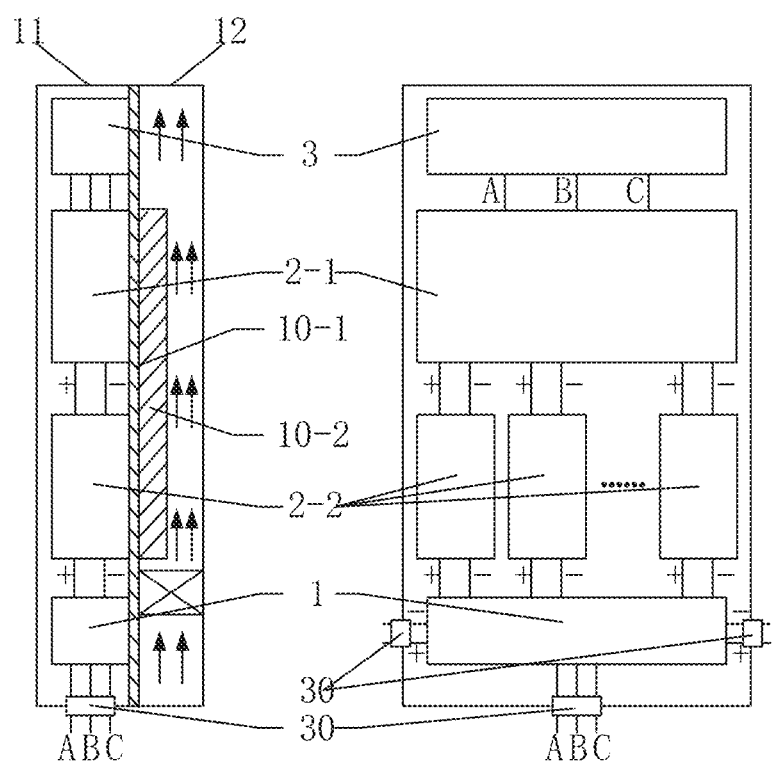
Figure 3:
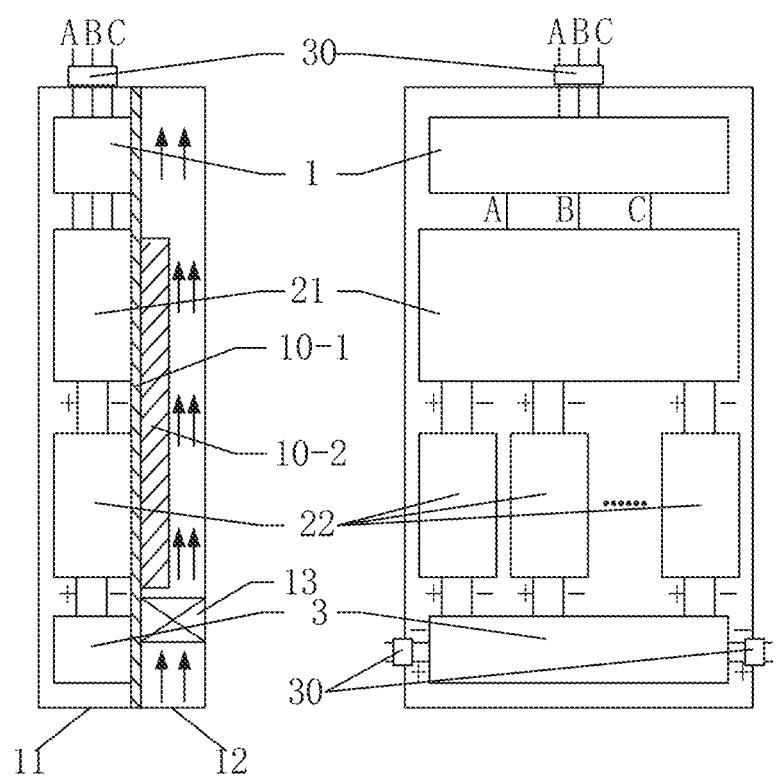
Figure 4:
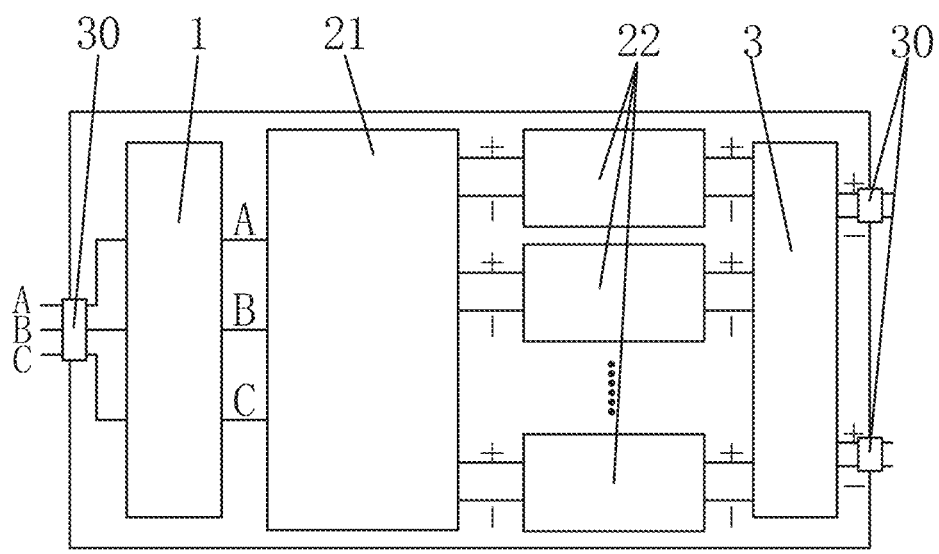
Figure 5:
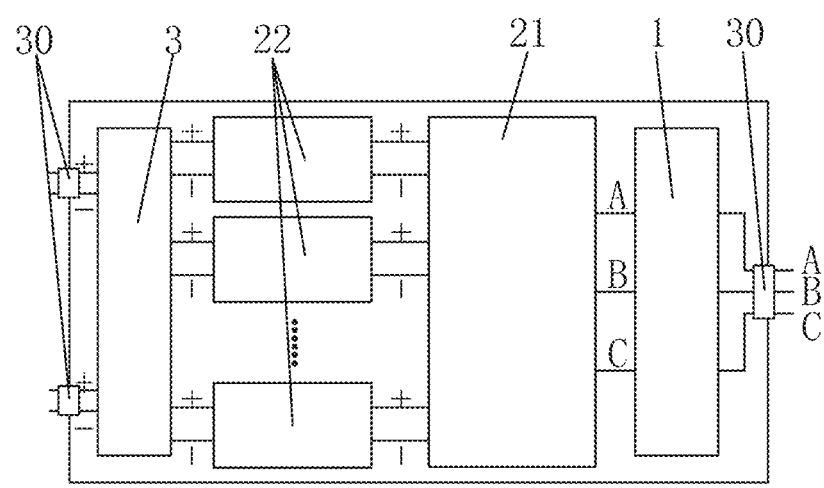

The power flow direction in the charging unit may be bottom-up (as illustrated in FIGS. 1 and 2), that is, the AC power is directly fed from a lower end of the first box 11; or, the power flow direction in the charging unit may also be top-bottom (as illustrated in FIG. 3), that is, AC power is directly fed from an upper end of the first box 11; or, the power flow direction in the charging unit may also be left-to-right (as illustrated in FIG. 4)), that is, the AC power is fed directly from a left end of the first box 11; or, the power flow direction in the charging unit may also be right-left (as illustrated in FIG. 5), that is, the AC power is fed directly from a right end of the first box 11; the power flow direction in the charging unit is not specifically limited here, and it depends on an actual situation, and all are within the protection scope of the present disclosure.

In practical applications, the units in the charging unit are arranged according to the power flow direction. Specifically, the units are arranged in sequence as follows: input of the three-phase AC cable to the waterproof terminal 30 at the inlet of the first box 11 to the AC power access unit of the charging unit 1 to the rectifier module of the charging unit to the DC/DC converter 2-3 of the charging unit to the power distribution unit of the charging unit 3 to a waterproof terminal 30 set at an interface of the charging gun and then to the charging gun. That is, when the above arrangement may be bottom-up in the power flow direction, the above arrangement is bottom-up; the other power flow directions are the same, which are not repeated one by one here, they are all within the scope of protection of the present disclosure.

It should be noted that reference number 21 in FIGS. 1 to 5 is the rectifier module, reference number 22 is the DC/DC converter, and reference number 100 in FIG. 7 is the heat dissipation air duct.

In this embodiment, the integrated design of the charging unit reduces unnecessary redundant design in the traditional charging pile, the whole pile may be made smaller in volume, lighter in weight, and higher in power density. In addition, each unit in the charging unit is reasonably arranged according to the power flow direction, so that a connection line between each unit is shorter and a structure is more reasonable.

In any of the above embodiments, the air-cooled radiator 200 includes: at least one heat dissipation plate and a fan 13.

The fan 13 is configured to agitate the airflow in the heat dissipation air duct.

The fan 13 is a heat dissipation fan with a high level of protection; its specific selection is not specifically limited here, and it depends on an actual situation, and all are within the protection scope of the present disclosure.

The heat dissipation plate includes: a substrate 10-2 and a heat exchanger 10-1. The substrate 10-2 serves as a common boundary plate for the first box 11 and the second box 12. One side of the heat exchanger 10-1 is arranged on the substrate 10-2 and arranged in the second box 12. The other surface of the heat exchanger 10-1 is provided with a dissipation fin to increase a thermal contact area, facilitate the airflow in the heat dissipation air duct to take away heat, and improve an efficiency of heat dissipation.

The power conversion unit 2 in the charging unit is arranged on the substrate 10-2; or the power conversion unit 2 in the charging unit sinks inside the heat exchanger 10-1, such as a switch and a magnetic element of the power conversion part sink inside the heat exchanger 10-1. The heat exchanger 10-1 is arranged in the heat dissipation air duct.

Specifically, the heat generated during operation of the charging unit is conducted through the heat dissipation plate of the radiator placed in the first box 11 to the heat dissipation plate placed in the second box 12, and then conducted to the fin of the heat exchanger 10-1. The airflow in the heat dissipation air duct is driven by the fan 13 to take away the heat and complete the heat dissipation.

The fan 13 is arranged at the bottom of the heat dissipation plate of the second box 12; alternatively, the fan 13 is arranged at the top of the heat dissipation plate of the second box 12; that is, it is arranged at the bottom or top of the heat exchanger 10-1.

In this embodiment, the power conversion unit 2 adopts an overall design, in addition, the air-cooled radiator 200 adopts a cooling air duct design to avoid a conflicting pain point between internal cooling heat dissipation and protection. The level of protection is significantly improved compared with the traditional solution. Due to a better cooling effect of air cooling, it is conducive to improvement of the power level.

It should be noted that the power conversion unit 2 includes a plurality of heating elements. Each of the heating elements is respectively arranged on each contact surface outside the air-cooled radiator 200. When the heating elements are respectively arranged on outer surfaces of the air-cooled radiator on multiple sides; the heating elements arranged on different outer surfaces are connected by cables in a sealed wire groove. The sealed cable groove includes: an AC sealed cable groove 111 for installing an AC cable, and a DC sealed cable groove 112 for installing a DC cable.

In practical applications, the heat dissipation air duct is a polygonal air duct surrounded by at least one heat dissipation plate. Specifically, the heat dissipation air duct may be formed by the heat dissipation plate of the air-cooled radiator and the other three sides of the second box 12, that is, the heat dissipation plate is only used as one side of the second box 12. The heat dissipation air duct may also be formed by two heat dissipation plates and the other two sides of the second box 12, that is, the heat dissipation plates are used as the two sides of the second box 12. The heat dissipation air duct may also be formed by multiple heat dissipation plates, that is, each side of the second box 12 is a heat dissipation plate.

The air-cooled radiator 200 may adopt a double-sided design, that is, there are two contact surfaces that can realize heat exchange; the air-cooled radiator 200 may also be a multi-sided design, that is, there are multiple contact surfaces that can realize heat exchange.

Figure 6:
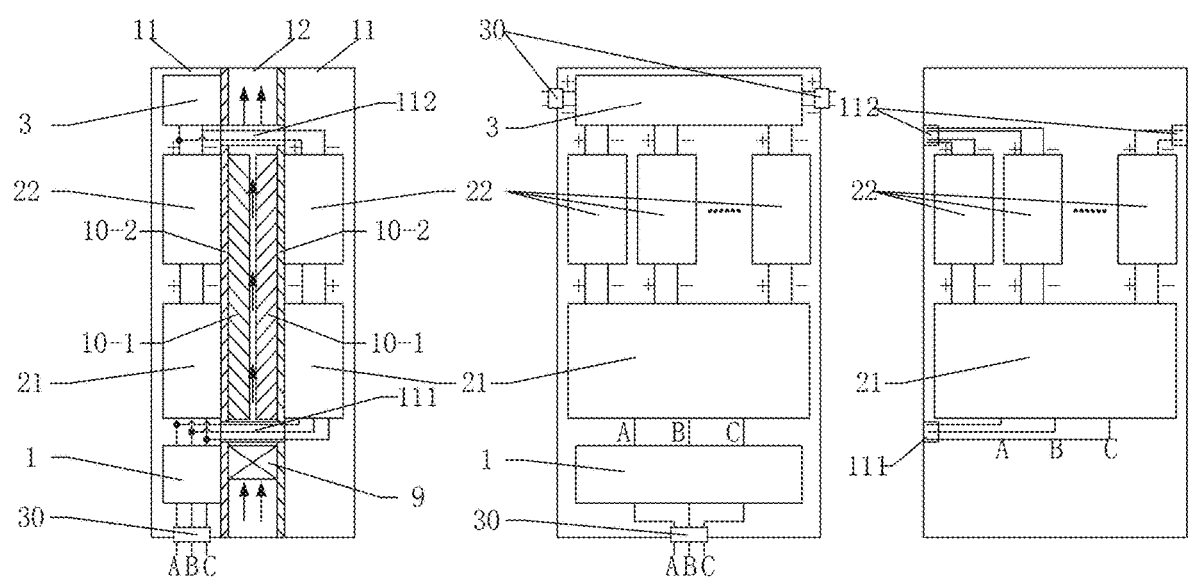
Figure 18:
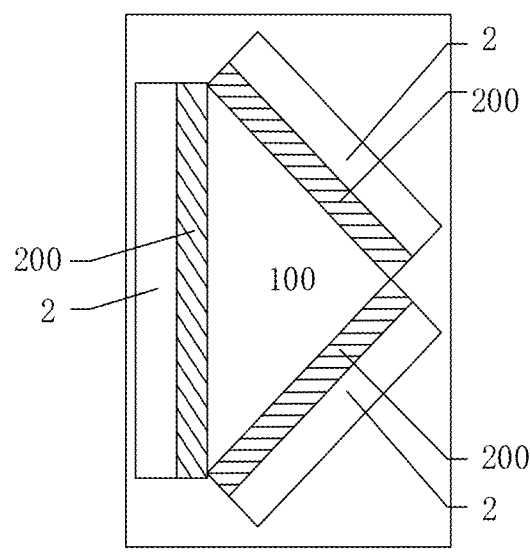
Figure 19:
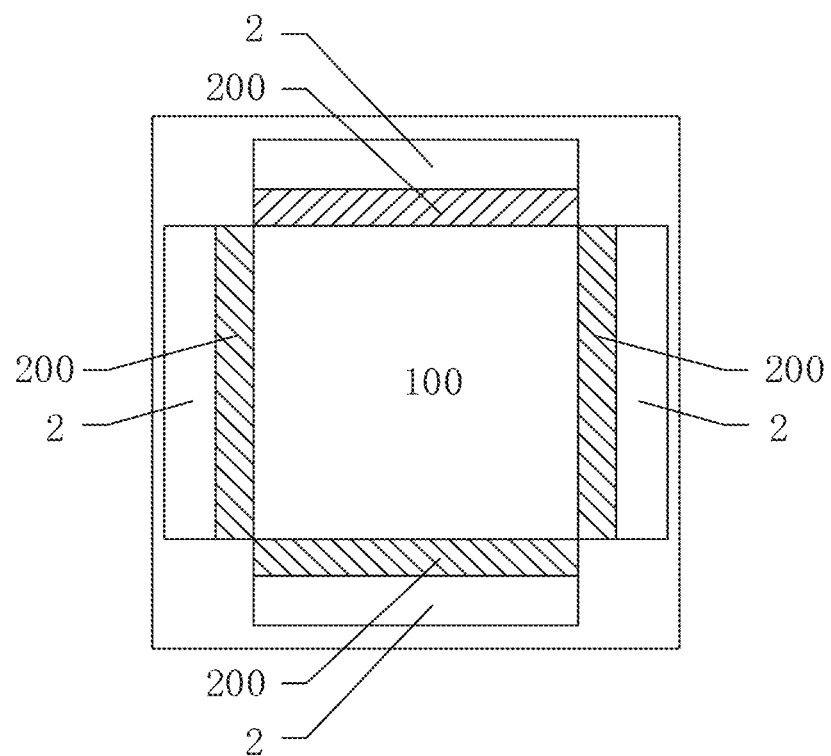

Specifically, when the number of air-cooled radiators 200 in the charging pile is 1, the air-cooled radiator 200 adopts a single-sided or double-sided design. As illustrated in FIGS. 1 to 3, when the air-cooled radiator 200 adopts the single-sided design, the number of the heat dissipation plate in the air-cooled radiator 200 is 1, the air-cooled radiator 200 has a contact surface that can realize heat exchange; the contact surface is provided with the heating element of the power conversion unit 2. Or, as illustrated in FIGS. 6 and 7, when the air-cooled radiator 200 adopts the double-sided design, the number of heat dissipation plate in the air-cooled radiator 200 is two, and the two heat dissipation plates are parallel, and the air-cooled radiator 200 has two heat exchanges. The contact surfaces of the two heat dissipation plates are provided with heating elements of the power conversion unit 2. The heat of the power conversion unit 2 is respectively conducted to the two contact surfaces; the heat dissipation air duct in the air-cooled radiator 200 takes away the heat of the air-cooled radiator 200, and then takes away the heat of the two heat dissipation plates. Of course, it may also be that only one contact surface of the heat dissipation plate is provided with the heating element of the power conversion unit 2. It should be noted that the heating elements respectively arranged on different contact surfaces are arranged in a sealed housing, that is, the first box 11 includes two sub-boxes, and a part of the heating elements in the two power conversion units 2 are respectively arranged in one box, other part of the heating elements in the power conversion unit 2 are arranged in another box. Two sub-boxes and one side of the two boxes are heat dissipation plates; the two sub-boxes adopt the sealed design. Of course, the air-cooled radiator 200 also adopts a multi-sided design, as illustrated in FIG. 18, the three heat dissipation plates in the air-cooled radiator 200 form a triangular prism structure, as illustrated in FIG. 19, the four heat dissipation plates in the air-cooled radiator 200 form a quadrangular prism structure, which will not be repeated here, and they are all within the protection scope of the present disclosure.

Figures 17A, 17B:
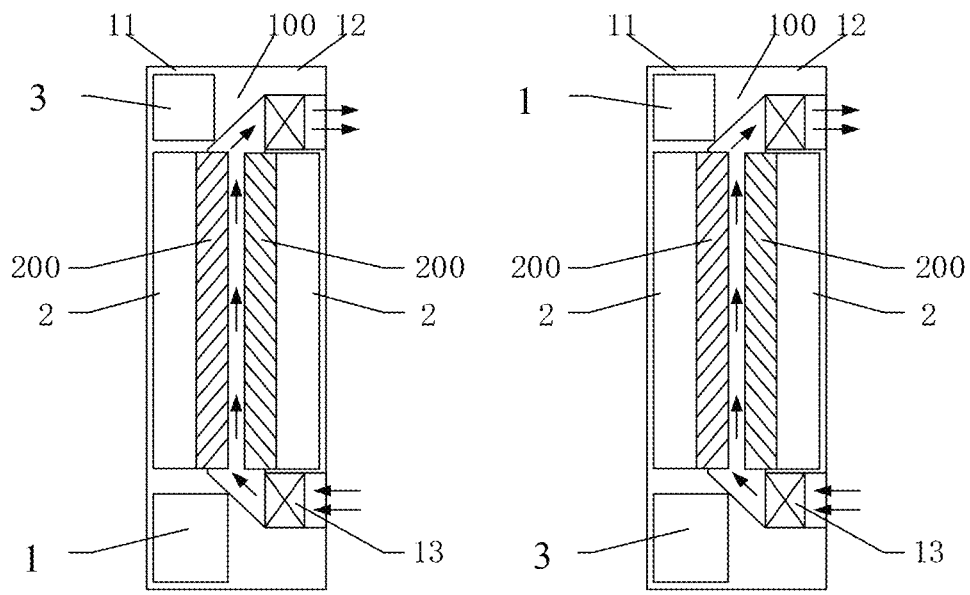

When the number of air-cooled radiators 200 in the charging pile is not 1, such as two, the double-sided or multi-sided design may be adopted between each air-cooled radiator 200. Specifically, when there are two air-cooled radiators 200 in the charging pile, the double-sided design may be adopted between the two air-cooled radiators 200, that is, the heat dissipation plates in the two air-cooled radiators 200 are parallel. When there are multiple air-cooled radiators 200 in the charging pile, each air-cooled radiator 200 may adopt a multi-sided design, that is, the heat dissipation plates in each air-cooled radiator 200 form the polygonal prism structure, such as the triangular prism structure. It should be noted that wind directions of the fans in each air-cooled radiator 200 are consistent, so that there is only one direction of air flow in the heat dissipation air duct (as illustrated in FIG. 17(a) and FIG. 17(b)). Of course, it does not rule out that the wind directions of the fans in each air-cooled radiator 200 are inconsistent, which will not be repeated here, and they are all within the protection scope of the present disclosure.

It should be noted that if the number of the power conversion unit 2 in the charging unit is m and the number of the heating elements in the power conversion unit 2 is h, then h*m heating elements are respectively arranged on the corresponding contact surfaces. Specifically, all the heating elements in the same power conversion unit 2 are arranged on the same contact surface. All the heating elements in different power conversion units 2 may be arranged on the same contact surface, for example, the h*m heating elements are all arranged on the same contact surface. Or, the power conversion unit 2 may be used as a unit. Each power conversion unit 2 is respectively arranged on different contact surfaces, for example, m power conversion units 2 correspond to m contact surfaces one-to-one, and each power conversion unit 2 is respectively disposed on its corresponding contact surface. A specific setting mode of each power conversion unit 2 is not specifically limited here, and it depends on actual situations, and all are within the protection scope of the present disclosure.

The AC power access unit 1, the rectifier module, the DC/DC converter 2-3, and the power distribution unit 3 are arranged in a sub-box. The rectifier module and the DC/DC converter 2-3 are arranged in the other box; that is, the two sub-boxes share a set of AC power access unit 1 and power distribution unit 3.

The two sub-boxes are respectively a first sub-box and a second sub-box. An input end of three-phase AC of the first sub-box is provided with a three-phase AC power distribution line input through an AC sealed wire slot 111 under one side of the box. A DC input end of the second box 12 is provided with DC power distribution line ports through DC sealed wire grooves 112 above two sides of the box, and is output to the power distribution unit 3 of the first sub-box.

A power flow direction in the first sub-box is arranged in sequence as: three-phase A, B, and C of the three-phase AC to a waterproof terminal 30 at the first sub-box to the AC power access unit 1 to the rectifier module to the DC/DC converter 2-3 to the power distribution unit 3 to the waterproof terminal 30 of the interface of the charging gun and to the charging gun. A power flow direction in the second sub-box is arranged in sequence for the same reason, which will not be repeated here, and they are all within the protection scope of the present disclosure.

When the air-cooled radiator 200 adopts the multi-sided design, the air-cooled radiator 200 has a polygonal prism structure, and the air-cooled radiator 200 has multiple contact surfaces. Specifically, the air-cooled radiator 200 has a triangular prism structure and has three contact surfaces; or, the air-cooled radiator 200 has a quadrangular prism structure and has four contact surfaces. At least one of the multiple contact surfaces of the air-cooled radiator 200 is provided with a heating element; of course, it is also possible that the multiple contact surfaces are both provided with a heating element. In order to avoid waste of resources of the air-cooled radiator 200 and increase in cost and weight, it is preferable that each contact surface is provided with a heating element.

Figure 14A:
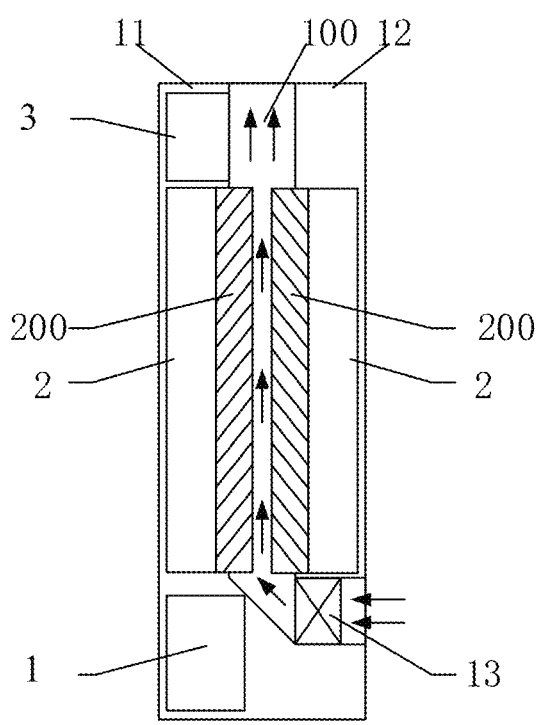
Figure 14B:
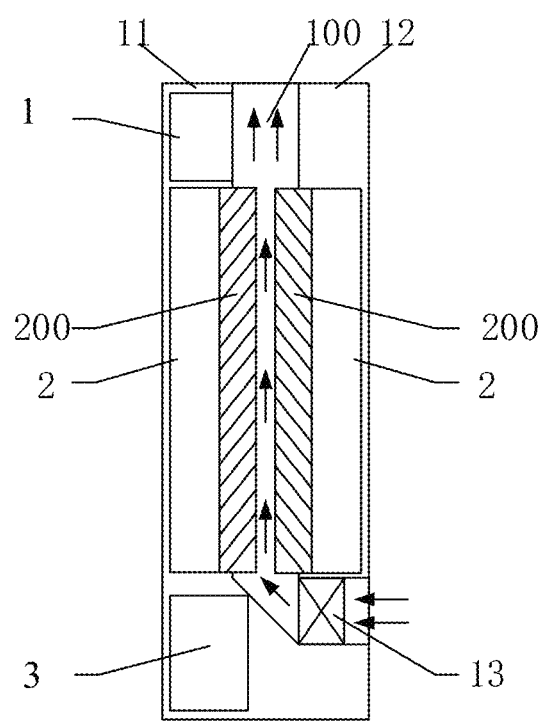

The second box 12 is provided in the center of the box, or at a position of a central axis of the box (as illustrated in FIG. 7, FIG. 14(a) and FIG. 14(b)). Correspondingly, the heat dissipation air duct is provided in the center of the box, or at the position of the central axis of the box.

In practical applications, the heat dissipation air duct is placed between an air inlet 14 and an air outlet 15 of the box.

The airflow direction in the heat dissipation air duct is one of bottom-up, top-down, left-to-right, and right-to-left. Specifically, the airflow direction in the heat dissipation air duct may be determined according to the power flow of the charging unit. For example, the airflow direction in the heat dissipation air duct is parallel to the power flow direction in the charging unit; the airflow direction in the heat dissipation air duct may be the same with or opposite to the power flow direction in the charging unit. For example, when the power flow direction is top-down, the airflow direction may be top-down or bottom-up; when the power flow direction is left-to-right, the airflow direction may be left-to-right or right-to-left. The power flow direction is bottom-up or right-to-left in the same way, which will not be repeated here. Of course, the airflow direction in the heat dissipation air duct may also intersect with the power flow direction in the charging unit, such as perpendicular; the airflow direction in the heat dissipation air duct will not be repeated here, and they are all within the protection scope of the present disclosure.

When the airflow direction in the heat dissipation air duct is bottom-top, setting positions of the air inlet 14 and the air outlet 15 of the box are one of the following.

Figure 15A:
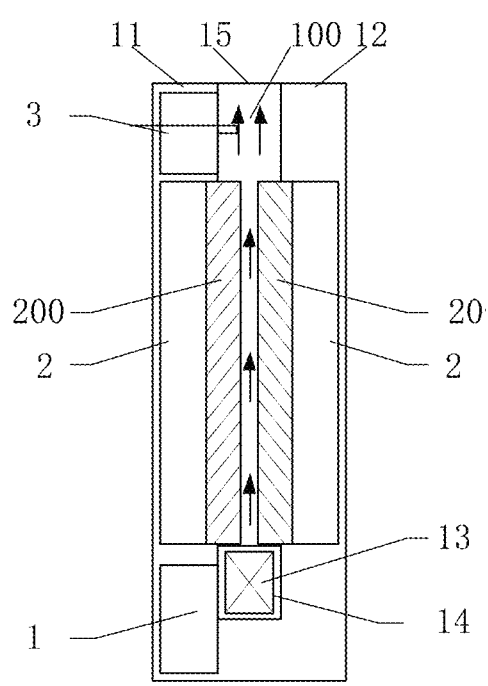
Figure 16A:
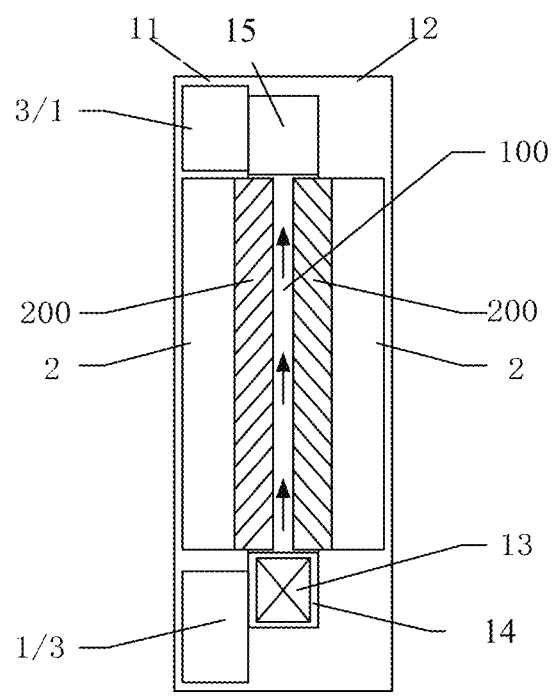

As illustrated in FIG. 15(a), the air inlet 14 is located on the lower side of the box, and the air outlet 15 is located at the top of the box. Of course, the air inlet 14 may be located on a back panel, and the air outlet 15 is located at the top of the box (not illustrated). As illustrated in FIG. 16(a), the air inlet 14 is located on the lower side of the box, and the air outlet 15 is located on the upper side of the box. As illustrated in FIG. 17(a) and FIG. 17(b), the air inlet 14 is located on a lower part of a rear cover, and the air outlet 15 is located on an upper side of the rear cover.

When the airflow direction in the heat dissipation air duct is bottom-top, the setting positions of the air inlet 14 and the air outlet 15 of the box are one of the following.

Figure 15B:
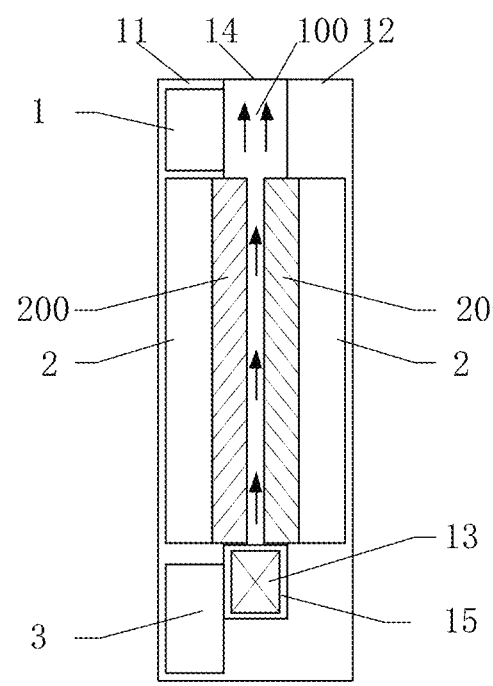
Figure 16B:
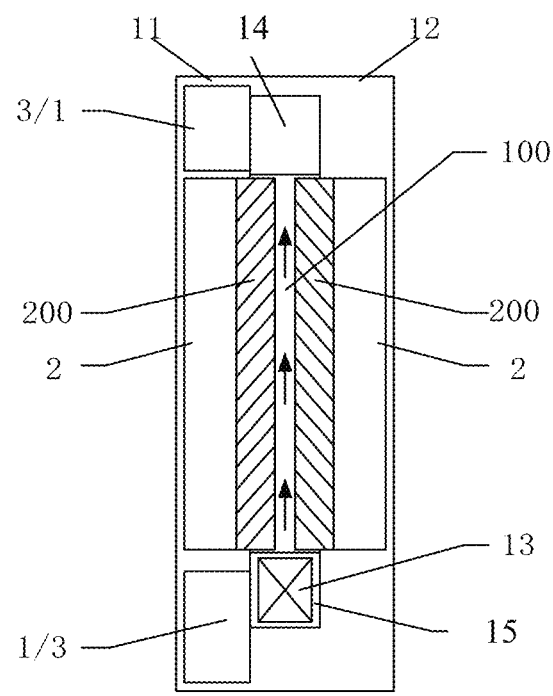

As illustrated in FIG. 15(b), the air inlet 14 is located at the top of the box, and the air outlet 15 is located on the side of the box; as illustrated in FIG. 16(b), the air inlet 14 is located on the upper side of the box, and the air outlet 15 is located on the lower side of the box; the air inlet 14 is located at an upper part of the rear cover of the box, and the air outlet 15 is located at the lower part of the rear cover of the box.

It should be noted that the structure illustrated in FIG. 15(a) to FIG. 17(b) is only an example of the double-sided design of the air-cooled radiator 200. The power distribution unit 3 and the AC power access unit 1 in the charging unit may be arranged in various ways. For details, please refer to the above-mentioned related embodiments, which will not be repeated here, and all are within the protection scope of the present disclosure.

In this embodiment, the multiple contact surfaces are provided with heating elements, thereby increasing a contact area between the power conversion unit 2 and the air-cooled radiator 200, thereby increasing a speed of heat dissipation of the power conversion unit 2.

In the above embodiment, referring to FIG. 20, a specific connection relationship in the charging unit is as follows.

The input end of the AC power access unit 1 serves as the input end of the charging unit of the charging pile for receiving AC power supply. The AC power may be three-phase AC power. Specifically, the AC power access unit 1 has three-phase input ends, which are A-phase input end, B-phase input end, and C-phase input end, respectively, as A-phase input end, B-phase input end, and C-phase input end of the charging unit of the charging pile. The A-phase input end of the AC power access unit 1 is used to receive A-phase AC power in the AC power supply, and the B-phase input end of the AC power access unit 1 is used to receive B-phase AC power in the AC power supply, and the C-phase input end of the AC power access unit 1 is used to receive C-phase AC power in the AC power supply. Of course, the AC power supply may be other phase AC power, such as single-phase AC power. There is no specific limitation here, and it depends on actual situations. The illustrated structure in this embodiment and the specific description of the related devices are all described with three-phase AC power supply as an example. Under other phases of AC power supply, the diagrams and specific descriptions of related devices are similar to the above descriptions and will not be repeated one by one, and they are all within the protection scope of the present disclosure.

The output end of the AC power access unit 1 is connected to the AC side of the power conversion unit 2; each DC side of the power conversion unit 2 is respectively connected to a plurality of input ends of the power distribution unit 3.

In practical applications, the power conversion unit 2 includes: a rectifier module and n DC/DC converters; n is an integer greater than 1.

The AC side of the rectifier module is used as the AC side of the power conversion unit 2. Specifically, the AC power access unit 1 has three-phase output ends, namely A-phase output end, B-phase output end, and C-phase output end. The AC side of the rectifier module also has three-phase AC sides, which are A-phase AC side, B-phase AC side and C-phase AC side. The A-phase output end of the AC power access unit 1 is connected to the A-phase AC side of the rectifier module, and the B-phase output end of the AC power access unit 1 is connected to the B-phase AC side of the rectifier module, and the C-phase output end of the AC power access unit 1 is connected to the C-phase AC side of the rectifier module.

A DC side of the rectifier module of the power conversion unit 2 is respectively connected to input ends of the n DC/DC converters of the power conversion unit 2, that is, one rectifier module may be connected to multiple DC/DC converters. In practical applications, the DC/DC converters may be isolated DC/DC converters, so as to realize isolation between high-voltage grid side and user side, as well as isolation between two receiving users during charging, and provide safety of the charging pile.

Output ends of the n DC/DC converters of the power conversion unit 2 are respectively used as output ends of the power conversion unit and are respectively connected to the multiple input ends of the power distribution unit 3. In practical applications, a connection relationship between the output ends of the n DC/DC converters of the power conversion unit and the multiple input ends of the power distribution unit is any one of one-to-one correspondence, many-to-one, and one-to-many. Specifically, the n output ends of the power conversion unit 2 may be connected to the n input ends of the power distribution unit 3 in a one-to-one correspondence. It may also be at least two output ends of the power conversion unit 2, that is, at least two output ends of the DC/DC converter are connected to the input end of the power distribution unit 3. Specifically, there are at least two output ends of the power conversion unit 2 connected in parallel with the input end of the power distribution unit 3, or at least one output end of the at least two power conversion units 2 is connected in parallel with the input end of the power distribution unit 3. There may also be an output end of the power conversion unit 2 connected to multiple input ends of the power distribution unit 3. There is no specific limitation here, and it depends on the actual situation, and they are all within the protection scope of the present disclosure.

Figure 21:
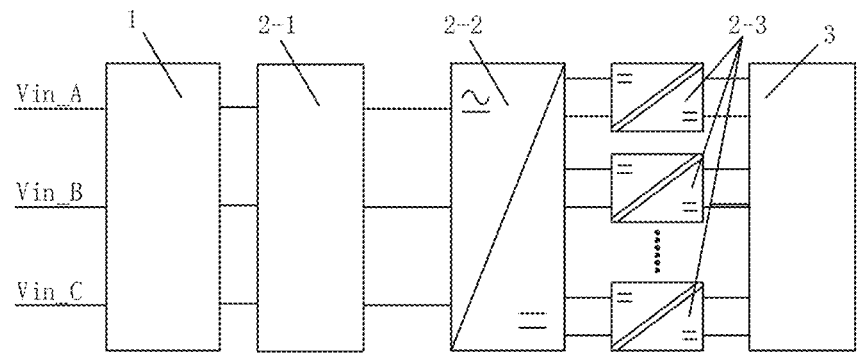
Figure 22:
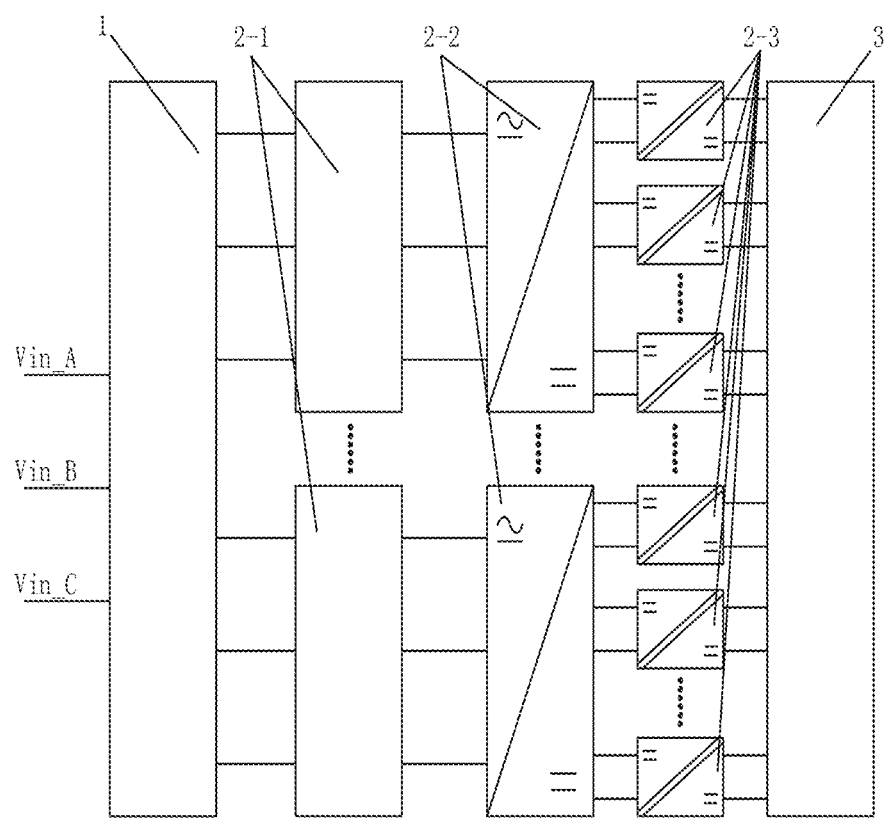

The number of power conversion units 2 may be one (as illustrated in FIG. 21), or multiple or two (as illustrated in FIG. 22). A specific structure of the power conversion unit 2 will not be repeated here, and they are all protected within range of the present disclosure. It should be noted that if the number of power conversion units 2 in the charging unit is m and the number of DC/DC converters in the power conversion unit 2 is n, the number of DC/DC converters in the charging unit is n×m; where m is an integer greater than zero.

When the number of power conversion units 2 is one, the AC side of the rectifier module in the power conversion unit 2 is connected to the output end of the AC power access unit 1, and the output ends of the n DC/DC converters in the power conversion unit 2 are respectively connected to the corresponding multiple input ends of the power distribution unit 3.

When the number of power conversion units 2 is not one, the AC side of the rectifier module in each power conversion unit 2 is connected to the output end of the AC power access unit 1, and the n output ends of the DC/DC converters in each power conversion unit 2, that is, the n×m output ends of the DC/DC converters are respectively connected to the multiple input ends of the power distribution unit 3.

Each output end of the power distribution unit 3 serves as each output end of the charging unit of the charging pile, and is used to charge the electrical equipment. Specifically, each output end of the power distribution unit 3 is connected to the charging gun of the charging pile, and each output end of the power distribution unit 3 is connected to a corresponding electrical equipment, such as an electric car, through a corresponding charging gun, so that the power distribution unit 3 provides charging power for the corresponding electrical equipment.

In practical applications, the power distribution unit 3 includes a multi-channel switch, so that multiple input electric energy of the power distribution unit 3 is output in an independent or series-parallel manner. In other words, the power distribution unit 3 may integrate the electric energy at its input end or directly output it. A specific input-output relationship of the power distribution unit 3 may be that one input in the power distribution unit 3 only provides electric energy for one output, the multiple inputs in the power distribution unit 3 all provide electric energy for one output, or, one input of the power distribution unit 3 provides electric energy for multiple outputs, which will not be repeated here, and they are all within the protection scope of the present disclosure.

This embodiment abandons a traditional scheme of modular stacking, breaks up the modules and recombines them, and no longer uses each module as a black box, but adopts an integrated design idea to connect multiple DC/DC converters through one rectifier module. This embodiment reduces complexity of system, improves integration of the charging pile, and reduces the cost, weight, and volume of the charging pile. Moreover, higher integration level of the rectifier module helps to improve reliability of the rectifier module. The output end of the rectifier module is mounted with multiple DC/DC converters, so that the output power distribution of the power conversion unit 2 may be made finer.

Figure 23:
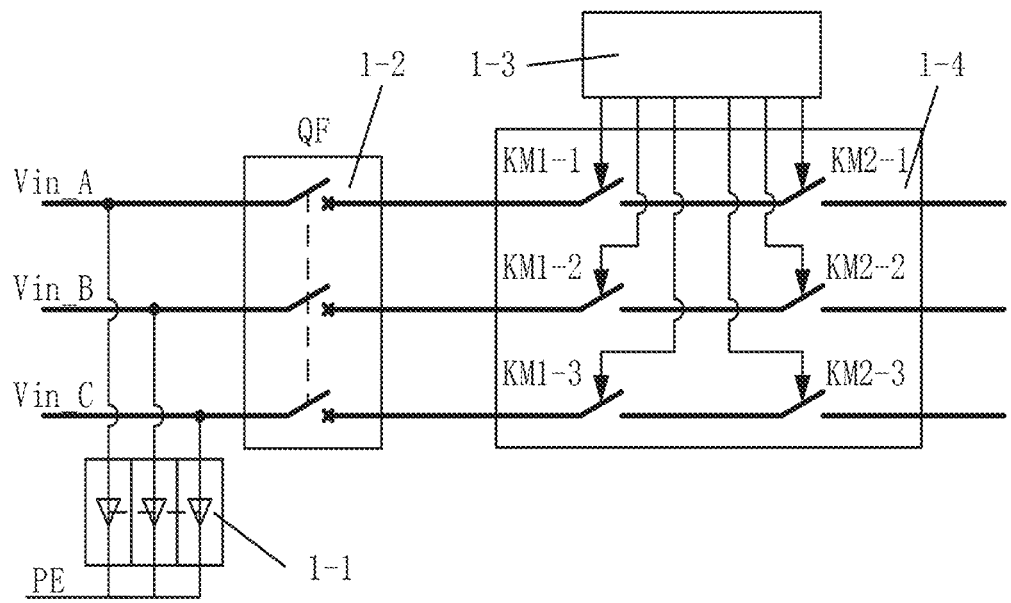

In the foregoing embodiment, the AC power access unit 1 includes a switch unit (including 1-2, 1-3, and 1-4 as illustrated in FIG. 23).

A, B, C three-phase inputs of the AC power supply, that is, A, B, C three-phase AC cables of the AC power supply, are grounded through a lightning arrester 1-1, and connected to input ends of the switch unit one-to-one correspondence.

In practical applications, the AC power access unit 1 also includes the lightning arrester 1-1. The A, B, C three-phase inputs of the AC power supply, that is, the A, B, C three-phase AC cables of the AC power supply, are grounded through the lightning arrester 1-1.

Specifically, the A-phase AC power Vin_A in the AC power supply is connected to an A-phase input end of the lightning arrester 1-1 and an A-phase input end of the switch unit respectively, and the B-phase AC power Vin_B in the AC power supply is connected to a B-phase input end of the lightning arrester 1-1 and a B-phase input end of the switch unit respectively, and the C-phase AC power Vin_C in the AC power supply is connected to a C-phase input end of the lightning arrester 1-1 and a C-phase input end of the switch unit respectively. A ground end of the lightning arrester 1-1 is grounded.

Output ends of the switch unit are respectively used as the output ends of the AC power access unit 1. Specifically, A-phase output end, B-phase output end, and C-phase output end of the switch unit are respectively used as the A-phase output end, the B-phase output end, and the C-phase output end of the AC power access unit 1.

In practical applications, the switch unit includes: a drive circuit 1-3 and an AC relay group 1-4.

Input ends of the AC relay group 1-4 are connected to the input ends of the switch unit. Specifically, the three-phase input ends of the AC relay group 1-4 are connected to the three-phase AC cables of the AC power supply in a one-to-one correspondence. An output end of the AC relay group 1-4 is connected to the output end of the switch unit. The AC relay group 1-4 is controlled by the drive circuit. The output end of the AC relay group 1-4 is used as the output end of the switch unit; that is, three-phase output ends of the AC relay group 1-4 are respectively used as the three-phase output ends of the switch unit and are connected in one-to-one correspondence with the three-phase input ends of the power conversion unit 2. It should be noted that the switch unit outputs three-phase AC to the power conversion unit 2. A control end of the AC relay group 1-4 is connected to the drive circuit 1-3, so that the AC relay group 1-4 is controlled by the drive circuit 1-3.

In practical applications, the switch unit further includes a circuit breaker 1-2. The circuit breaker 1-2 is arranged between the input ends of the switch unit and the input ends of the AC relay group 1-4; that is, three-phase input ends of the circuit breaker 1-2 are respectively used as the three-phase input ends of the switch unit, and are respectively connected to the three-phase AC cables of the AC power supply in a one-to-one correspondence. The three-phase output ends of the circuit breaker 1-2 are respectively connected to the three-phase input ends of the AC relay group 1-4 in a one-to-one correspondence.

The aforementioned AC relay group 1-4 includes switch subunits respectively arranged on each phase cable in the AC relay group 1-4. Specifically, a switch subunit is set on A-phase cable of the AC relay group 1-4, a switch subunit is set on B-phase cable of the AC relay group 1-4, and a switch subunit is set on C-phase cable of the AC relay group 1-4.

The switch subunits include at least one relay.

Figure 24:
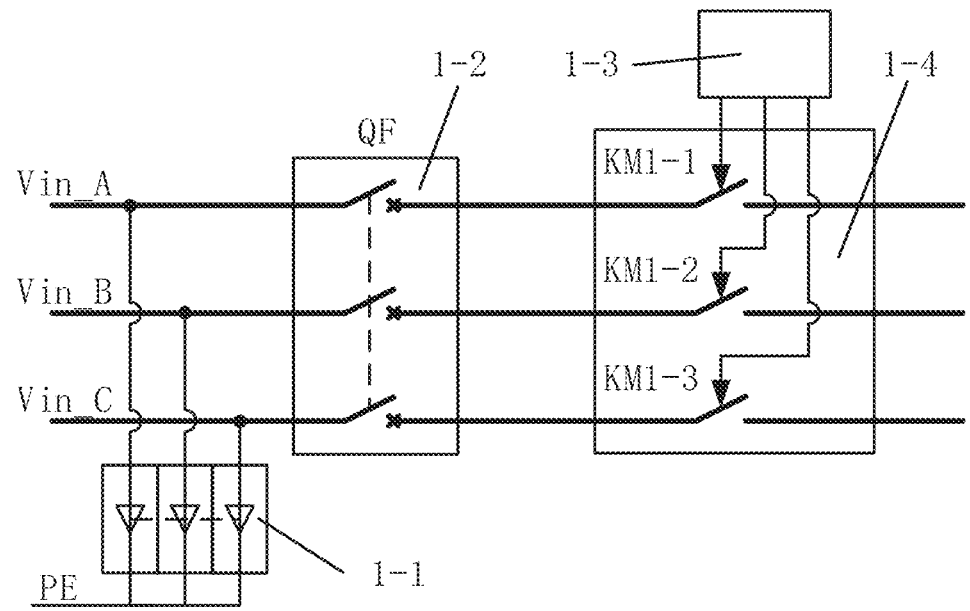

Specifically, the switch subunits may only include one relay (KM1-1, KM1-2 or KM1-3 as illustrated in FIG. 24). As illustrated in FIG. 24, the drive circuit 1-3 is connected to the relays KM1-1, KM1-1, and KM1-3, respectively. The relays KM1-1, KM1-2 and KM1-3 are all controlled by the drive circuit 1-3, and the drive circuit 1-3 controls the relays KM1-1, KM1-2 and KM1-3 to complete turn-on and turn-off.

Alternatively, the switch subunits may also include multiple relays connected in series, such as two relays connected in series (as illustrated in FIG. 23 KM1-1 and KM2-1, KM1-2 and KM2-2, or KM1-3 and KM2-3). When the switch subunits include multiple relays connected in series, each relay in the switch subunits backs up each other to prevent the switch subunits from being unable to reliably close and open after one of the relays fails. As illustrated in FIG. 23, while the drive circuit 1-3 is connected to the relays KM1-1, KM1-2 and KM1-3, it is also connected to the relays KM2-1, KM2-2 and KM2-3. Relays KM1-1, KM1-2, KM1-3, KM2-1, KM2-2 and KM2-3 are all controlled by the drive circuit 1-3. The drive circuit 1-3 controls two relays in each switch subunit to turn on and turn off at the same time.

In this embodiment, the AC power access unit 1 uses the relays for switching, so that the AC power access unit 1 has a smaller footprint, lighter weight, and more advantageous cost. In addition, when the switch subunits include multiple groups of relays for switching, switching failures caused by relay adhesion may be prevented.

In practical applications, the rectifier module includes: an electromagnetic compatibility (EMC) circuit 2-1 and an AC/DC converter 2-2.

An input end of the EMC circuit 2-1 is used as the AC side of the rectifier module and is connected to the output end of the AC power access unit 1. The EMC circuit 2-1 is used to implement EMC filtering to prevent the clutter or noise generated in the rectifier module from being transmitted to the grid or radiated out through space. An output end of EMC circuit 2-1 is connected to an AC side of AC/DC converter 2-2; a DC side of AC/DC converter 2-2 is used as the DC side of the rectifier module. The AC/DC converter 2-2 is used for AC/DC conversion and power factor control of the AC power supply.

In practical applications, the rectifier module also includes a power factor correction (PFC) unit. Specifically, the PFC unit has various forms. The following three forms of PFC unit are explained: the PFC unit is independently installed in a front stage of the AC/DC converter; or, the PFC unit is integrated in the AC/DC converter; or, the AC/DC converter is integrated in the PFC unit. The existence forms of the PFC unit are not specifically limited here, and depend on actual situations, and they are all within the protection scope of the present disclosure.

The PFC unit may be a hardware circuit or a software module. There is no specific limitation here, and it depends on actual situations, and all are within the protection scope of the present disclosure.

It should be noted that the EMC circuit 2-1 has three-phase input and output, and the AC/DC converter 2-2 with PFC function also has a three-phase AC side, so that the charging unit may receive three-phase AC power.

In practical applications, the charging unit may adopt centralized control or distributed control. The centralized control and distributed control are described below.

Figure 25:
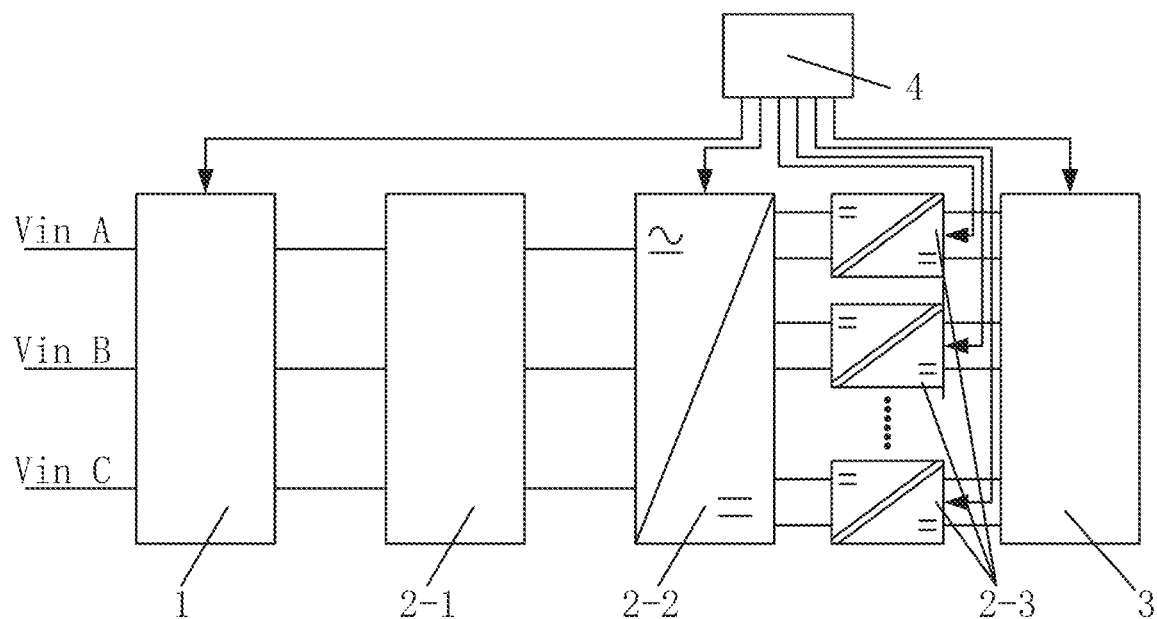

(1) As illustrated in FIG. 25, when the charging unit adopts centralized control, the charging unit further includes a centralized control unit 4. The centralized control unit 4 directly controls the AC power access unit 1, the power conversion unit 2, and the power distribution unit 3 to perform corresponding actions respectively.

Specifically, the centralized control unit 4 sends a first control signal to the AC power access unit 1 to control on and off of a switching device in the AC power access unit 1, so that the AC power access unit 1 may switch on and off, and then implement whether the power conversion unit 2 accesses to AC power supply or not. Specifically, the centralized control unit 4 sends the first control signal to the drive circuit 1-3 of the AC power access unit 1, and the drive circuit 1-3 controls the corresponding relay to turn on or off according to the first control signal.

The centralized control unit 4 sends a PWM signal to the power conversion unit 2 to control an on-off duty cycle of the switching device in the power conversion unit 2 so that the power conversion unit 2 may implement electric energy conversion. Specifically, the centralized control unit 4 directly controls the on-off duty cycle of the switching device in the AC/DC converter 2-2; and, the centralized control unit 4 directly controls switching frequency and duty cycle of the switch device in each DC/DC converter 2-3.

The centralized control unit 4 sends a second control signal to the power distribution unit 3 to control the on and off of the switching device in the power distribution unit 3, so that the power distribution unit 3 implements the distribution of output power. Specifically, the centralized control unit 4 controls the on and off of a corresponding switch in the power distribution unit 3 according to actual demand, that is, power supply demand of the electrical equipment, so as to realize series-parallel output or independent output of the corresponding DC/DC converter 2-3, to complete output of different voltages and different powers.

Figure 26:
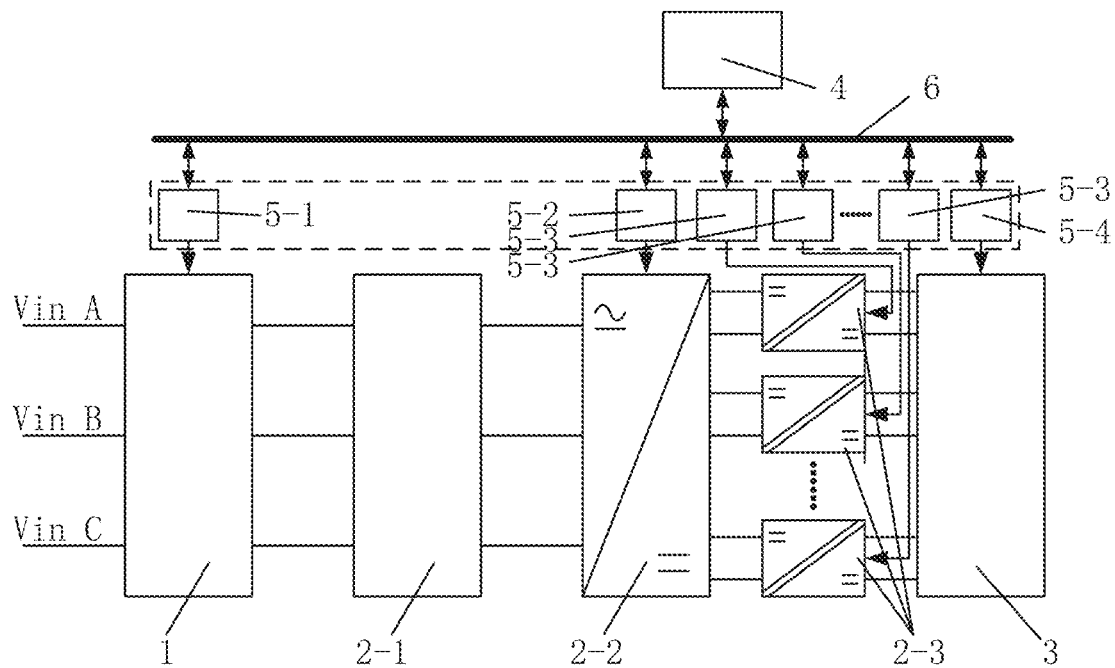

(2) As illustrated in FIG. 26, when the charging unit adopts distributed control, the charging unit further includes a distributed control unit. The distributed control unit includes: a system controller 4 and multiple sub-controllers.

Each sub-controller is respectively connected to the system controller 4 in communication. Specifically, each sub-controller communicates with the system controller 4 through communication bus 6.

It should be noted that each sub-controller may be a relatively simple and low-cost controller to reduce the cost of the charging pile.

In practical applications, each sub-controller includes: a first sub-controller 5-1, m second sub-controllers 5-2, n*m third sub-controllers 5-3, and a fourth sub-controller 5-4; m is the number of power conversion units 2, and m is a positive integer.

The first sub-controller 5-1 is used to send a control signal to the AC power access unit 1 to enable the AC power access unit 1 to switch on and off. Specifically, the system controller 4 controller sends an on/off signal to the first sub-controller 5-1 through the communication bus, and the sub-controller controls the AC relay group 1-4 to turn on or off through the drive circuit 1-3 in the AC power access unit 1.

The second sub-controllers 5-2 are used to send a PWM signal to the corresponding rectifier module, so that the rectifier module implements power factor control and AC/DC conversion. Specifically, the system controller 4 sends the PWM signal to the second sub-controllers 5-2 through the communication bus, and the second sub-controllers 5-2 control the switching tube of the rectifier module in the power conversion unit 2 to emit waves to implement the exchange for DC conversion. It should be noted that the second sub-controllers 5-2 may be controllers in the rectification module, or controllers independent of the rectification module; there is no specific limitation here, and it depends on actual situations, they are all within the scope of protection of the present disclosure.

The third sub-controllers 5-3 are used to send a PWM signal to the corresponding DC/DC converter 2-3, so that the DC/DC converter 2-3 implements electric energy conversion. Specifically, the system controller 4 sends the PWM signal to the third sub-controllers 5-3 through the communication bus, and the third sub-controllers 5-3 control the switching tube in the DC/DC converter 2-3 to emit waves to implement the DC/DC conversion.

The fourth sub-controller 5-4 is used to send a control signal to the power distribution unit 3 so that the power distribution unit 3 realizes the distribution of output power. Specifically, the system controller 4 controls the on and off of the corresponding switch in the power distribution unit 3 according to the actual demand, that is, the power supply demand of the electrical equipment, so as to implement the series-parallel output or independent output of the corresponding DC/DC converters 2-3 to complete the output of different voltages and different powers.

It should be noted that the distributed control unit and the centralized control unit 4 may also communicate with a host computer through a communication interface, which will not be repeated here, and they are all within the protection scope of the present disclosure.

In this embodiment, the integrated design of each device in the charging unit allows the charging unit to be controlled in multiple ways. The control of the charging unit is mainly completed by the centralized control unit 4 or the system controller 4 in the distributed control unit. The control process is simple.

The features described in the various embodiments in this specification can be replaced or combined with each other, and references may be made among these embodiments with respect to the same or similar portions among these embodiments. Each of the embodiments is mainly focused on describing its differences from other embodiments. Especially, since system embodiments are similar to method embodiments, the description thereof is relatively simple, and reference may be made to the description of the method embodiments for relevant parts. The embodiments of the system and the system described above are only schematic. The above unit described as a separate component may be or may be not separate physically. The component displayed as a unit may be or may be not a physical unit, that is, may be located at one place or may be distributed on multiple network units. The object of the solution of each of the embodiments may be achieved by selecting a part or all of the modules according to the practical needs. The present application can be understood and implemented by those skilled in the art without any creative efforts.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A charging station for electric vehicles, comprising: a charging unit and at least one air-cooled radiator, the charging unit and the at least one air-cooled radiator being arranged in a box of the charging station, wherein,
    the box comprises a first box and a second box, a protection level of the first box is higher than a protection level of the second box;
    the charging unit is arranged in the first box;
    an independent heat dissipation air duct is provided in the second box so that the charging unit dissipates heat through the heat dissipation air duct;
    the charging unit is configured to charge an electrical equipment;
    the second box is provided in the center of the box, or at a position of a central axis of the box; and
    the charging unit comprises at least one power conversion unit, the power conversion unit comprises a plurality of heating elements, and the plurality of heating elements are arranged on a plurality of sides of the air-cooled radiator.

2. The charging station for electric vehicles according to claim 1, wherein the first box adopts a sealed design.

3. The charging station for electric vehicles according to claim 1, wherein the charging unit further comprises: an alternating current (AC) power access unit and a power distribution unit, wherein,
    an input end of the AC power access unit is configured to be an input end of the charging unit for receiving AC power supply;
    an output end of the AC power access unit is connected to an AC side of the power conversion unit;
    a plurality of direct current (DC) sides of the power conversion unit are respectively connected to a plurality of input ends of the power distribution unit; and
    an output end of the power distribution unit is configured to be an output end of the charging unit.

4. The charging station for electric vehicles according to claim 3, wherein each of the plurality of heating elements on different sides of the air-cooled radiator is connected by a cable in a sealed wire groove.

5. The charging station for electric vehicles according to claim 1, wherein the first box is provided with waterproof terminals at both the input end and the output end of the charging unit.

6. The charging station for electric vehicles according to claim 1, wherein the air-cooled radiator comprises at least one heat dissipation plate and a fan;
one side of the heat dissipation plate is arranged in the first box, and the other side of the heat dissipation plate is arranged in the second box; and
the fan is configured to agitate the airflow in the heat dissipation air duct.

7. The charging station for electric vehicles according to claim 6, wherein the heat dissipation plate comprises a substrate and a heat exchanger;
the substrate is configured to be a common boundary plate for the first box and the second box;
one side of the heat exchanger is arranged on the substrate in the second box;
the other side of the heat exchanger is provided with a heat dissipation fin.

8. The charging station for electric vehicles according to claim 7, wherein the power conversion unit in the charging unit is provided on the substrate; or
the power conversion unit in the charging unit sinks inside the heat exchanger.

9. The charging station for electric vehicles according to claim 6, wherein the fan is arranged at bottom or top of the heat dissipation plate in the second box.

10. The charging station for electric vehicles according to claim 6, wherein two heat dissipation plates are provided, and the two heat dissipation plates are parallel; or a plurality of heat dissipation plates are provided, and each of the plurality of heat dissipation plates forms a polygonal prism structure; and
the heat dissipation air duct is arranged between each of the plurality of heat dissipation plates.

11. The charging station for electric vehicles according to claim 3, wherein the AC power access unit and the power distribution unit are arranged in any one of the following ways:
the power distribution unit and the AC power access unit are respectively arranged at top and bottom inside of the box;
the power distribution unit and the AC power access unit are both arranged at the top inside of the box; and
the power distribution unit and the AC power access unit are both arranged at the bottom inside of the box.

12. The charging station for electric vehicles according to claim 3, wherein the power conversion unit comprises: a rectifier module and n DC/DC converters, where n is an integer greater than 1;
an AC side of the rectifier module is configured to be an input end of the power conversion unit;
a DC side of the rectifier module is connected to input ends of the n DC/DC converters respectively; and
output ends of the n DC/DC converters are respectively configured to be output ends of the power conversion unit.

13. The charging station for electric vehicles according to claim 3, wherein the AC power access unit comprises a switch unit;
A, B, and C three-phase inputs of an AC power supply are connected to input ends of the switch unit in a one-to-one correspondence; and
output ends of the switch unit respectively are configured to be the output end of the AC power access unit.

14. The charging station for electric vehicles according to claim 13, wherein the switch unit comprises a drive circuit and an AC relay group;
input ends of the AC relay group are connected to the input ends of the switch unit;
output ends of the AC relay group are connected to the output ends of the switch unit; and
the AC relay group is controlled by the drive circuit.

15. The charging station for electric vehicles according to claim 14, wherein the AC relay group comprises switch subunits respectively arranged on each phase cable in the AC relay group.

16. The charging station for electric vehicles according to claim 14, wherein the switch unit further comprises a circuit breaker, and the circuit breaker is arranged between the input ends of the switch unit and the input ends of the AC relay group.

17. The charging station for electric vehicles according to claim 13, wherein the AC power access unit further comprises a lightning arrester, and the A, B, and C three-phase inputs of the AC power supply are grounded through the lightning arrester.

18. The charging station for electric vehicles according to claim 3, wherein the charging unit further comprises a centralized control unit, and the centralized control unit is configured to:
send a first control signal to the AC power access unit to enable the AC power access unit to switch on and off;
send a pulse width modulation (PWM) signal to the power conversion unit to enable the power conversion unit to implement electric energy conversion; and,
send a second control signal to the power distribution unit to enable the power distribution unit to implement distribution of output power.

19. The charging station for electric vehicles according to claim 3, wherein the charging unit further comprises a distributed control unit,
the distributed control unit comprises a system controller and multiple sub-controllers; and
each of the sub-controllers is respectively connected to the system controller in communication.

20. The charging station for electric vehicles according to claim 1, wherein the charging station further comprises at least one charging gun arranged outside of the box, and the charging unit charges the electrical equipment through the charging gun.

21. The charging station for electric vehicles according to claim 3, wherein the AC power access unit and the power distribution unit are arranged in any one of the following ways:
one of the power distribution unit and the AC power access unit is located at front end of the power conversion unit and at the top inside of the box, and the other one is located at the bottom inside of the box; and
one of the power distribution unit and the AC power access unit is located at the front end of the power conversion unit and arranged at the bottom inside of the box, and the other one is located at the top inside of the box.

22. The charging station for electric vehicles according to claim 3, wherein
the power distribution unit and the AC power access unit are both located at the front end of the power conversion unit and are respectively located at the top and bottom inside of the box.

* * * * *